US012395979B2

(12) United States Patent
Yoshioka et al.

(10) Patent No.: US 12,395,979 B2
(45) Date of Patent: Aug. 19, 2025

(54) USER EQUIPMENT AND COMMUNICATION APPARATUS

(71) Applicant: NTT DOCOMO, INC., Tokyo (JP)

(72) Inventors: Shohei Yoshioka, Tokyo (JP); Satoshi Nagata, Tokyo (JP); Huan Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 624 days.

(21) Appl. No.: 17/417,272

(22) PCT Filed: Dec. 27, 2018

(86) PCT No.: PCT/JP2018/048377
§ 371 (c)(1),
(2) Date: Jun. 22, 2021

(87) PCT Pub. No.: WO2020/136852
PCT Pub. Date: Jul. 2, 2020

(65) Prior Publication Data
US 2022/0053521 A1 Feb. 17, 2022

(51) Int. Cl.
*H04W 72/20* (2023.01)
*H04L 1/1812* (2023.01)
*H04L 5/00* (2006.01)
*H04W 72/0446* (2023.01)
*H04W 72/1263* (2023.01)

(52) U.S. Cl.
CPC ....... *H04W 72/1263* (2013.01); *H04L 1/1812* (2013.01); *H04L 5/0053* (2013.01); *H04W 72/0446* (2013.01); *H04W 72/20* (2023.01)

(58) Field of Classification Search
CPC ............ H04W 72/0446; H04W 72/12; H04W 72/1263; H04W 72/1278; H04W 72/20; H04W 28/0231; H04W 28/0252; H04W 28/0278; H04L 1/1812; H04L 5/0053
USPC ......................................................... 370/329
See application file for complete search history.

(56) References Cited

U.S. PATENT DOCUMENTS 9,681,460 B2 * 6/2017 Akimoto ............. H04W 72/542
11,510,230 B2 * 11/2022 Zhao .................. H04L 5/0053
2016/0021566 A1 1/2016 Kimura et al.
(Continued)

FOREIGN PATENT DOCUMENTS

JP 2017-502619 A 1/2017
WO 2014/167883 A1 10/2014

OTHER PUBLICATIONS

3GPP TSG RAN WG1 Meeting #95; R1-1812401 "Physical Layer Procedures for Unicast and Groupcast" Fraunhofer HHI, Fraunhofer IIS; Spokane, USA; Nov. 12-16, 2018 (8 pages).
(Continued)

*Primary Examiner* — Jean A Gelin
(74) *Attorney, Agent, or Firm* — Osha Bergman Watanabe & Burton LLP

(57) ABSTRACT

A user equipment including: a transmission unit configured to transmit sidelink data based on control information for sidelink scheduling received from a communication apparatus; and a reception unit configured to receive HARQ-ACK information for the sidelink data from a user equipment that receives the sidelink data, wherein the transmission unit transmits the HARQ-ACK information for the sidelink data to the communication apparatus.

5 Claims, 11 Drawing Sheets

(56) References Cited

U.S. PATENT DOCUMENTS

| | | | |
|---|---|---|---|
| 2016/0345312 A1* | 11/2016 | Kim | H04W 72/0446 |
| 2017/0048829 A1* | 2/2017 | Kim | H04L 5/0053 |
| 2017/0230956 A1* | 8/2017 | Kim | H04L 5/0032 |
| 2017/0295601 A1* | 10/2017 | Kim | H04W 72/20 |
| 2017/0325277 A1* | 11/2017 | Fujishiro | H04W 4/06 |
| 2018/0084457 A1* | 3/2018 | Lin | H04W 28/06 |
| 2018/0219665 A1* | 8/2018 | Yu | H04L 1/1858 |
| 2018/0376525 A1* | 12/2018 | Feng | H04W 76/11 |
| 2019/0349919 A1* | 11/2019 | Oh | H04W 72/1268 |
| 2020/0029318 A1* | 1/2020 | Guo | H04W 4/40 |
| 2020/0177352 A1* | 6/2020 | Peng | H04W 72/21 |
| 2020/0178118 A1* | 6/2020 | Lin | H04L 1/1896 |
| 2020/0344778 A1* | 10/2020 | Zhao | H04L 5/0053 |
| 2020/0374744 A1* | 11/2020 | Liu | H04W 28/0268 |
| 2020/0389914 A1* | 12/2020 | Zhao | H04W 72/23 |
| 2020/0413429 A1* | 12/2020 | Tang | H04W 28/0268 |
| 2021/0203452 A1* | 7/2021 | Lin | H04L 1/1819 |
| 2021/0203456 A1* | 7/2021 | Zhao | H04B 7/0639 |
| 2021/0218511 A1* | 7/2021 | Zhang | H04L 5/0048 |
| 2021/0274474 A1* | 9/2021 | Cheng | H04W 72/0446 |
| 2021/0400632 A1* | 12/2021 | Yang | H04L 5/0044 |
| 2022/0046694 A1* | 2/2022 | Park | H04W 76/27 |
| 2022/0060293 A1* | 2/2022 | Matsumura | H04L 5/0053 |
| 2023/0163924 A1* | 5/2023 | Lee | H04W 72/115 |
| | | | 370/329 |

OTHER PUBLICATIONS

3GPP TSG-RAN WG2 Meeting #104; R2-1816897 "HARQ Procedure for Mode 1" CATT; Spokane, USA; Nov. 12-16, 2018 (5 pages).
Extended European Search Report issued in European Application No. 18944890.5, dated May 12, 2022 (11 pages).
Office Action in the counterpart Chinese Application No. 201880100457.6, mailed May 30, 2023 (18 pages).
International Search Report issued in PCT/JP2018/048377 on Feb. 26, 2019 (5 pages).
Written Opinion of the International Searching Authority issued in PCT/JP2018/048377 on Feb. 26, 2019 (7 pages).
Huawei, HiSilicon; "Sidelink physical layer procedures for NR V2X"; 3GPP TSG RAN WG1 Meeting #95, R1-1812205; Spokane, USA; Nov. 12-16, 2018 (12 pages).
3GPP TS 36.211 V15.3.0; "3rd Generation Partnership Project; Technical Specification Group Radio Access Network; Evolved Universal Terrestrial Radio Access (E-UTRA); Physical channels and modulation (Release 15)"; Sep. 2018 (243 pages).
3GPP TR 22.886 V15.1.0; "3rd Generation Partnership Project; Technical Specification Group Services and System Aspects; Study on enhancement of 3GPP Support for 5G V2X Services (Release 15)"; Mar. 2017 (58 pages).
Office Action issued in counterpart European Patent Application No. 18 944 890.5 mailed on Oct. 18, 2023 (5 pages).

* cited by examiner (a)

(b)

USER EQUIPMENT AND COMMUNICATION APPARATUS

TECHNICAL FIELD

The present invention relates to a user equipment and a communication apparatus in a wireless communication system.

BACKGROUND ART

In LTE (Long Term Evolution) and LTE successor systems (e.g., LTE-A (LTE Advanced), NR (New Radio) (5G)), a D2D (Device to Device) technology in which user equipments communicate directly with each other without using a base station apparatus is under consideration (e.g., Non-Patent Document 1).

The D2D reduces traffic between the user equipment and the base station apparatus and enables communication between user equipments even when the base station apparatus is unable to communicate during a disaster, etc. In the 3rd Generation Partnership Project (3rd GPP), D2D is called "sidelink".

D2D communication is broadly classified into D2D discovery (also referred to as D2D discovery and D2D discovery) for discovering other user equipments capable of communication, and D2D communication (D2D direct communication, D2D communication, terminal-to-terminal direct communication, etc.) for communicating directly between user equipments. Hereinafter, when D2D communication, D2D discovery, etc. are not specifically distinguished, it is simply referred to as D2D (or sidelink). A signal sent and received by D2D is called a D2D signal. Various use cases of V2X (Vehicle to Everything) services in NR have been studied (e.g., Non-Patent Document 2).

PRIOR ART DOCUMENTS

Non-Patent Documents

[Non-Patent Document 1] 3GPP TS 36.211 V15.3.0 (September 2018)
[Non-Patent Document 2] 3GPP TR 22.886 V15.1.0 (March 2017)

SUMMARY OF INVENTION

Problem to be Solved by the Invention

In V2X, there is a transmission mode in which scheduling is performed by a base station apparatus or a user equipment having scheduling capability. The sender of the scheduling information must know whether the data transmitted by the scheduling has been successfully received and, if necessary, transmit scheduling information for retransmission.

In order to perform the retransmission control as described above, HARQ (Hybrid Automatic Repeat Quest) operation is performed between the user equipment and the base station apparatus. However, in the prior art of sidelink including V2X, a specific method of HARQ operation has not been proposed, and thus there is a problem that the conventional sidelink cannot perform the HARQ operation properly.

The present invention has been made in view of the foregoing, and is intended to provide a technique for enabling proper execution of HARQ operations in sidelink.

Means for Solving Problems

According to the disclosed technique, there is provided a user equipment including:
a transmission unit configured to transmit sidelink data based on control information for sidelink scheduling received from a communication apparatus; and
a reception unit configured to receive HARQ-ACK information for the sidelink data from a user equipment that receives the sidelink data,
wherein the transmission unit transmits the HARQ-ACK information for the sidelink data to the communication apparatus.

Effects of the Invention

According to the disclosed technique, a technique is provided which enables the proper execution of HARQ operation in sidelink.

MODE FOR CARRYING OUT THE INVENTION

Hereinafter, embodiments of the present invention will be described with reference to the drawings. The embodiments described below are examples, and the embodiments to which the present invention is applied are not limited to the following embodiments.

In operating a wireless communication system according to an embodiment of the present invention, existing techniques are used as appropriate. However, the existing technology is, for example, an existing LTE, but is not limited to an existing LTE. The term "LTE" as used herein shall also have abroad meaning including LTE-Advanced and LTE-Advanced or later forms (e.g., NR) or WLAN (Local Area Network), unless otherwise specified.

The following description also uses the names of channels such as PSSCH (Physical Sidelink Shared Channel) and PSCCH (Physical Sidelink Control Channel), which are currently described in the LTE specification. In the NR, channels with similar functions may be called with different names. The PSSCH is referred to as a data channel for the sidelink, and PSCCH is referred to as a control channel for the sidelink.

In embodiments of the present invention, the duplex mode may be a TDD (Time Division Duplex) method, a FDD (Frequency Division Duplex) mode, or any other mode (e.g., Flexible Duplex, etc.).

In an embodiment of the present invention, "a wireless parameter or the like is configured" may mean "a predetermined value is pre-configured" or "a wireless parameter notified by the base station apparatus 10 or the user equipment 20 is set".

Figure 1:
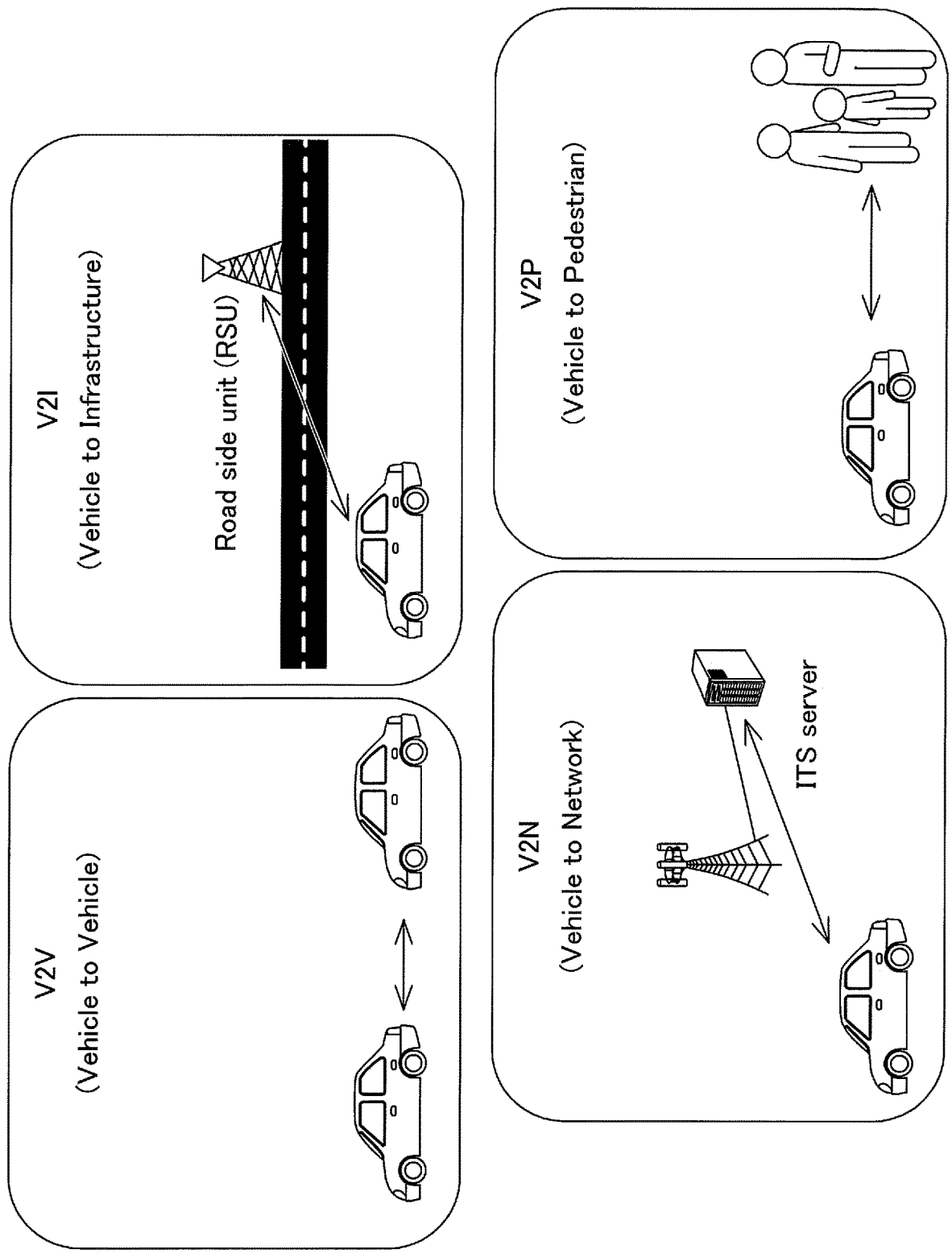
FIG. 1 is a diagram for explaining V2X.

FIG. 1 is a diagram for explaining V2X. In the 3GPP, the D2D function is being extended to realize either V2X (Vehicle to Everything) or eV2X (enhanced V2X) and specification is being studied. As shown in FIG. 1, V2X is a collective term for V2V (Vehicle to Vehicle), which is part of ITS (Intelligent Transport Systems), which means the form of communication between vehicles, V2I (Vehicle to Infrastructure), which means the form of communication between vehicles and roadside equipment (Road-Side Unit), V2N (Vehicle to Network), which means the form of communication between vehicles and ITS servers, and V2P (Vehicle to Pedestrian), which means the form of communication between vehicles and mobile terminals owned by pedestrians.

In addition, V2X using LTE or NR cellular communication and terminal-to-terminal communication is being studied in 3GPP. V2X using cellular communication is also called cellular V2X. NR's V2X is considering realizing large capacity, low delay, high reliability, and QoS (Quality of Service) control.

It is anticipated that the V2X of LTE or NR will be studied not limited to the 3GPP specification in the future. For example, it is envisaged that interoperability, cost reduction by upper layer implementation, use of combination of multiple RATs (Radio Access Technology) or methods for switching them, regulatory compliance in each country, data acquisition, distribution, database management and use of it in LTE or NR V2X platforms will be considered.

Embodiments of the present invention are primarily assumed to include a user equipment mounted in a vehicle, but embodiments of the present invention are not limited to such embodiments. For example, the user equipment may be a terminal held by a person, the user equipment may be a drone or a device mounted on an aircraft, a device in which the user equipment has base station capabilities, an RSU, a relay node, a user equipment having scheduling capabilities, and the like.

Note that SL (Sidelink) may be distinguished on the basis of either UL (Uplink), DL (Downlink), 1)-4) below or combinations of them. The SL may also be another name.
1) Resource allocation in the time domain
2) Frequency domain resource allocation
3) Synchronization signal (including SLSS (Sidelink Synchronization Signal)) to be referenced
4) Reference signal used for pathloss measurement for transmission power control Also, for SL or UL OFDM (Orthogonal Frequency Division Multiplexing), either CP-OFDM (Cyclic-Prefix OFDM), DFT-S-OFDM (Discrete Fourier Transform-Spread-OFDM), OFDM without Transform precoding or OFDM with Transform precoding may be applied.

In the SL of LTE, Mode3 and Mode4 are specified for allocating SL resources to the user equipment 20. In Mode 3, transmission resources are dynamically allocated by a DCI (Downlink Control Information) transmitted from the base station apparatus 10 to the user equipment 20. In Mode 3, SPS (Semi Persistent Scheduling) is also possible. In Mode4, the user equipment 20 autonomously selects transmission resources from a resource pool.

A slot in embodiments of the present invention may be replaced by a symbol, a mini-slot, a subframe, a radio frame, or a TTI (Transmission Time Interval). Cells in embodiments of the present invention may also be read as cell groups, carrier components, BWPs, resource pools, resources, RAT (Radio Access Technology), systems (including wireless LANs), and the like.

Figure 2:
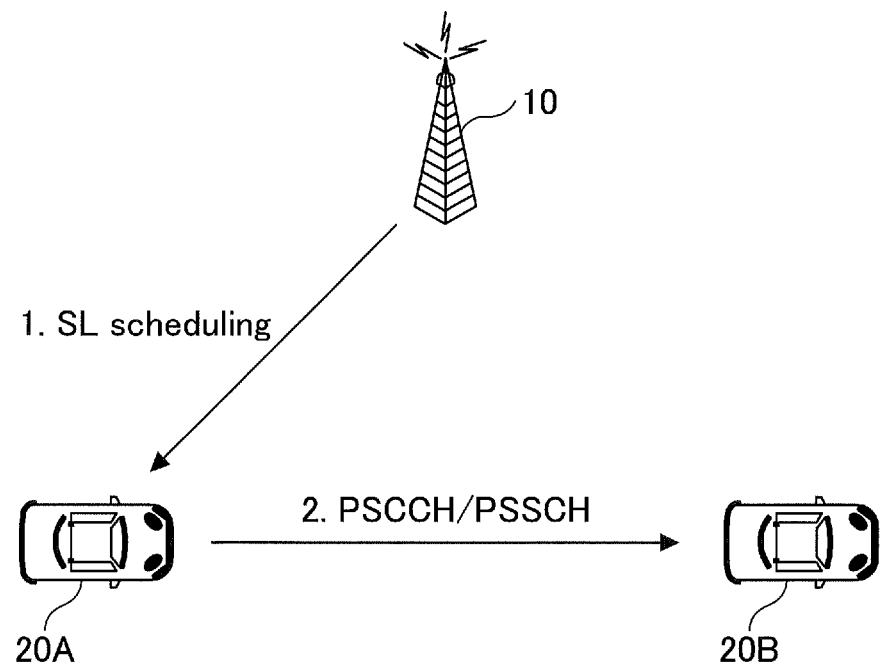
FIG. 2 is a diagram illustrating an example (1) of a transmission mode of V2X.

FIG. 2 is a diagram for explaining an example (1) of a transmission mode of V2X. In the transmission mode of the sidelink communication shown in FIG. 2, in Step 1, the base station apparatus 10 transmits a sidelink scheduling to the user equipment 20A. Subsequently, the user equipment 20A transmits PSCCH (Physical Sidelink Control Channel) and PSSCH (Physical Sidelink Shared Channel) to the user equipment 20B based on the received scheduling (Step 2). The transmission mode of the sidelink communication shown in FIG. 2 may be referred to as a sidelink transmission mode 3 in the LTE. In the sidelink transmission mode 3 in the LTE, Uu-based sidelink scheduling is performed. Uu is a wireless interface between UTRAN (Universal Terrestrial Radio Access Network) and UE (User Equipment). The transmission mode of the sidelink communication shown in FIG. 2 may be referred to as the sidelink transmission mode 1 in the NR.

Figure 3:
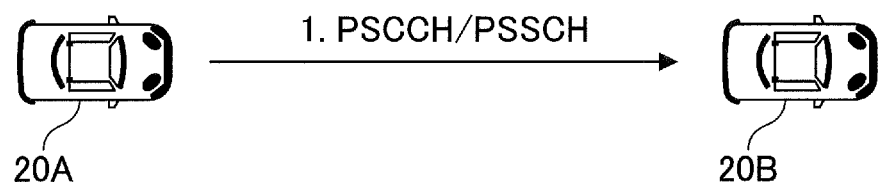
FIG. 3 is a diagram illustrating an example (2) of a transmission mode of V2X.

FIG. 3 is a diagram for explaining an example (2) of a transmission mode of V2X. In the sidelink communication transmission mode shown in FIG. 3, in step 1, the user equipment 20A transmits PSCCH and PSSCH to the user equipment 20B using autonomously selected resources. The transmission mode of the sidelink communication shown in FIG. 3 may be referred to as the sidelink transmission mode 4 in the LTE. In the sidelink transmission mode 4 in the LTE, the UE itself performs resource selection.

Figure 4:
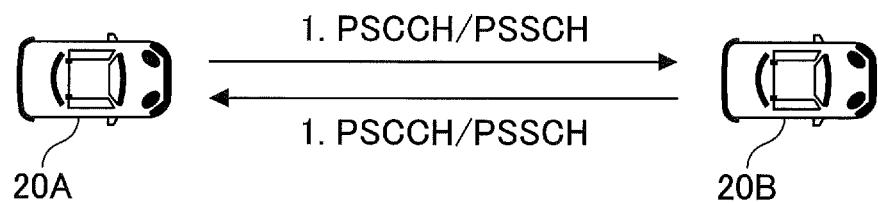
FIG. 4 is a diagram illustrating an example (3) of a transmission mode of V2X.

FIG. 4 is a diagram for explaining an example (3) of a transmission mode of V2X. In the sidelink communication transmission mode shown in FIG. 4, in step 1, the user equipment 20A transmits PSCCH and PSSCH to the user equipment 20B using autonomously selected resources. Similarly, user equipment 20B transmits PSCCH and PSSCH to user equipment 20A using autonomously selected resources (step 1). The transmission mode of the sidelink communication shown in FIG. 4 may be referred to as the sidelink transmission mode 2a in the NR. In the sidelink transmission mode 2 in the NR, the UE itself performs resource selection.

Figure 5:
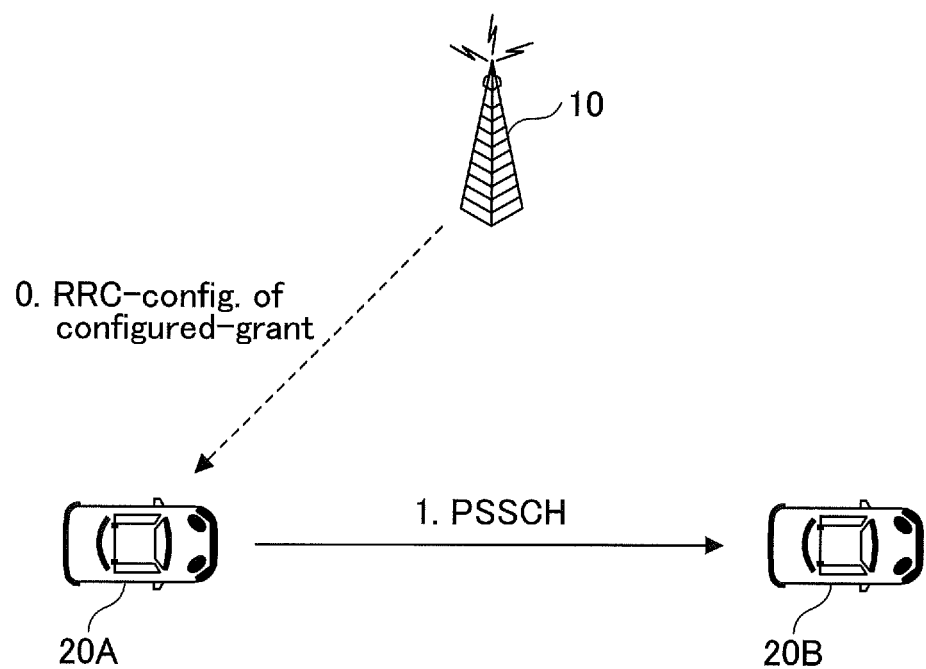
FIG. 5 is a diagram illustrating an example (4) of a transmission mode of V2X.

FIG. 5 is a diagram for explaining an example (4) of a transmission mode of V2X. In the sidelink communication transmission mode shown in FIG. 5, in step 0, the base station apparatus 10 transmits the sidelink scheduling grant to the user equipment 20A via the RRC (Radio Resource Control) configuration. Subsequently, the user equipment 20A transmits the PSSCH to the user equipment 20B based on the received scheduling (Step 1). The transmission mode of the sidelink communication shown in FIG. 5 may be referred to as the sidelink transmission mode 2c in the NR.

Figure 6:
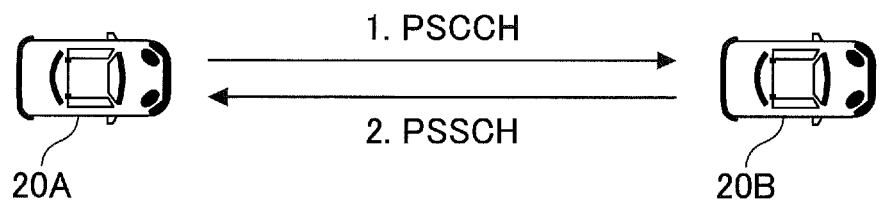
FIG. 6 is a diagram illustrating an example (5) of a transmission mode of V2X.

FIG. 6 is a diagram for explaining an example (5) of a transmission mode of V2X. In the transmission mode of the sidelink communication shown in FIG. 6, in step 1, the user equipment 20A transmits the sidelink scheduling to the user equipment 20B via the PSCCH. Subsequently, the user equipment 20B transmits the PSSCH to the user equipment 20A based on the received scheduling (Step 2). The transmission mode of the sidelink communication shown in FIG. 6 may be referred to as the sidelink transmission mode 2d in the NR.

Figure 7:
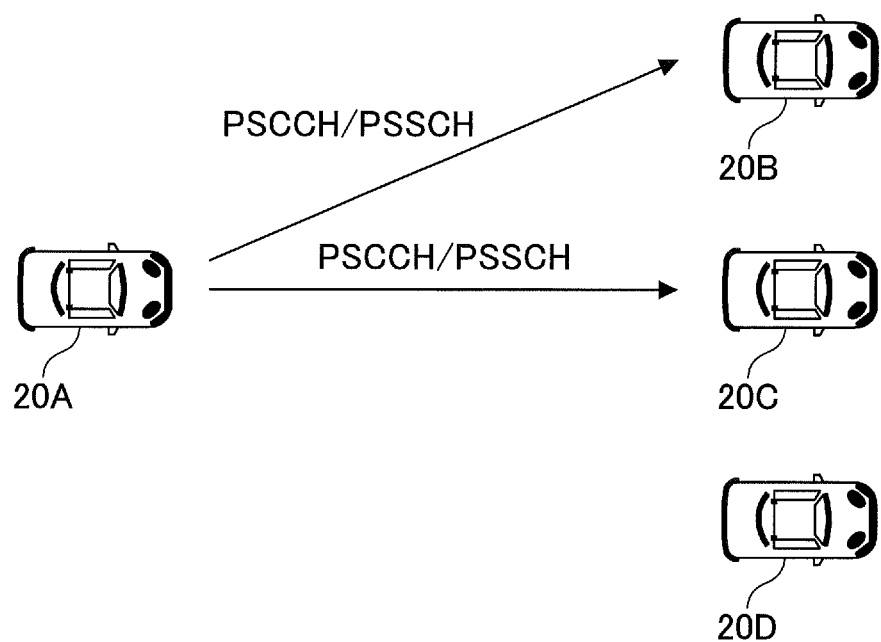
FIG. 7 is a diagram illustrating an example (1) of a communication type of V2X.

FIG. 7 is a diagram for explaining an example (1) of a communication type of V2X. The sidelink communication type shown in FIG. 7 is unicast. User equipment 20A transmits PSCCH and PSSCH to the user equipment 20. In the example shown in FIG. 7, the user equipment 20A performs unicast to the user equipment 20B and performs unicast to the user equipment 20C.

Figure 8:
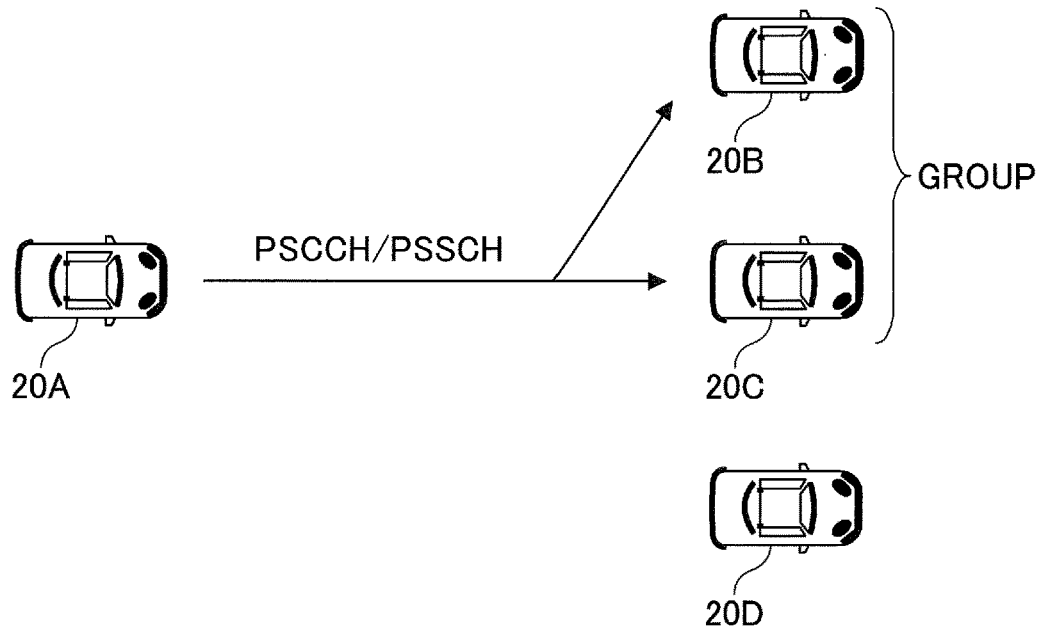
FIG. 8 is a diagram illustrating an example (2) of a communication type of V2X.

FIG. 8 is a diagram for explaining an example (2) of a communication type of V2X. The sidelink communication type shown in FIG. 8 is a group cast. User equipment 20A transmits PSCCH and PSSCH to a group to which one or more user equipments 20 belong. In the example shown in FIG. 8, the group includes a user equipment 20B and a user equipment 20C, and the user equipment 20A performs group casting on the group.

Figure 9:
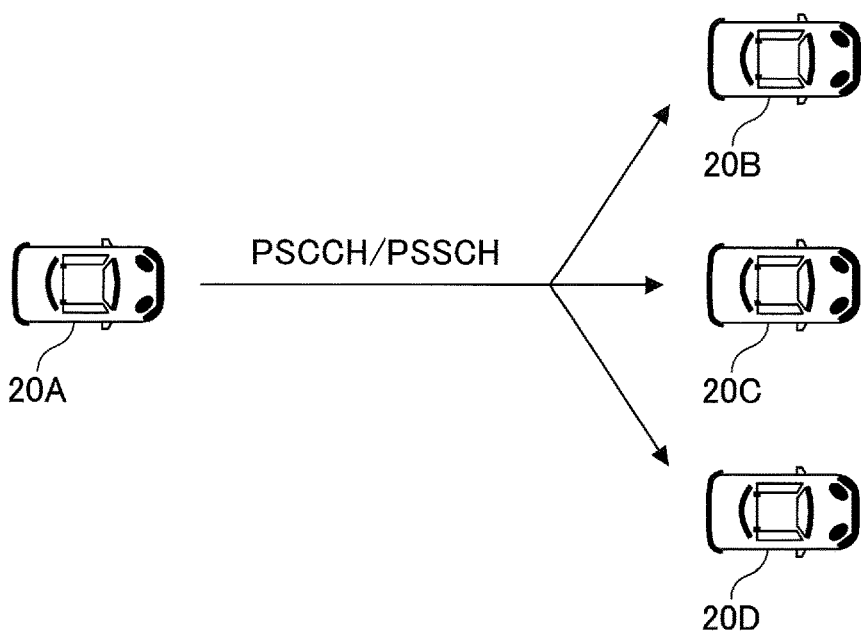
FIG. 9 is a diagram illustrating an example (3) of a communication type of V2X.

FIG. 9 is a diagram for explaining an example (3) of a communication type of V2X. The sidelink communication type shown in FIG. 9 is broadcast. User equipment 20A transmits PSCCH and PSSCH to one or more user equipments 20. In the example shown in FIG. 9, the user equipment 20A broadcasts to the user equipment 20B, the user equipment 20C, and the user equipment 20D. The user equipment 20A shown in FIGS. 7 to 9 may be referred to as a header UE.

In addition, it is assumed that HARQ is supported for unicasts and groupcasts of sidelink in NR-V2X. In addition, SFCI (Sidelink Feedback Control Information) containing HARQ response is defined in NR-V2X. In addition, SFCI transmission via PSFCH (Physical Sidelink Feedback Channel) is under consideration.

In the following description, PSFCH is used in the transmission of HARQ-ACK on the sidelink. This is an example. For example, PSCCH may be used to transmit HARQ-ACK at the sidelink, PSSCH may be used to transmit HARQ-ACK at the sidelink, or other channels may be used to transmit HARQ-ACK at the sidelink.

(Problems)

As described above, it is assumed that HARQ operation is supported in NR-V2X. However, there is no specific proposal on how to send HARQ-ACK in the configuration assumed in NR-V2X. Accordingly, there is a problem with the prior art that HARQ-ACK reporting cannot be performed properly. Hereinafter, as an example of a method for solving the problem, examples 1 to 5 will be described.

Hereinafter, for convenience, the general information reported by the user equipment 20 in the HARQ is referred to as HARQ-ACK. This HARQ-ACK may also be referred to as HARQ-ACK information. More specifically, the information of the HARQ-ACK reported from the user equipment 20 to the base station apparatus 10 or the like is called a HARQ-ACK codebook. The HARQ-ACK codebook is a bit sequence of HARQ-ACK information. "HARQ-ACK" sends not only ACK but also NACK.

(Example 1)

In the example 1, in the sidelink transmission mode 1 illustrated in FIG. 2, the user equipment 20B that received SL data by a PSSCH transmits a HARQ-ACK by a PSFCH to the user equipment 20A that transmitted the data. The user equipment 20A transmits a HARQ-ACK including the HARQ-ACK to the base station apparatus 10.

<Configuration Example of Example 1>

Figure 10:
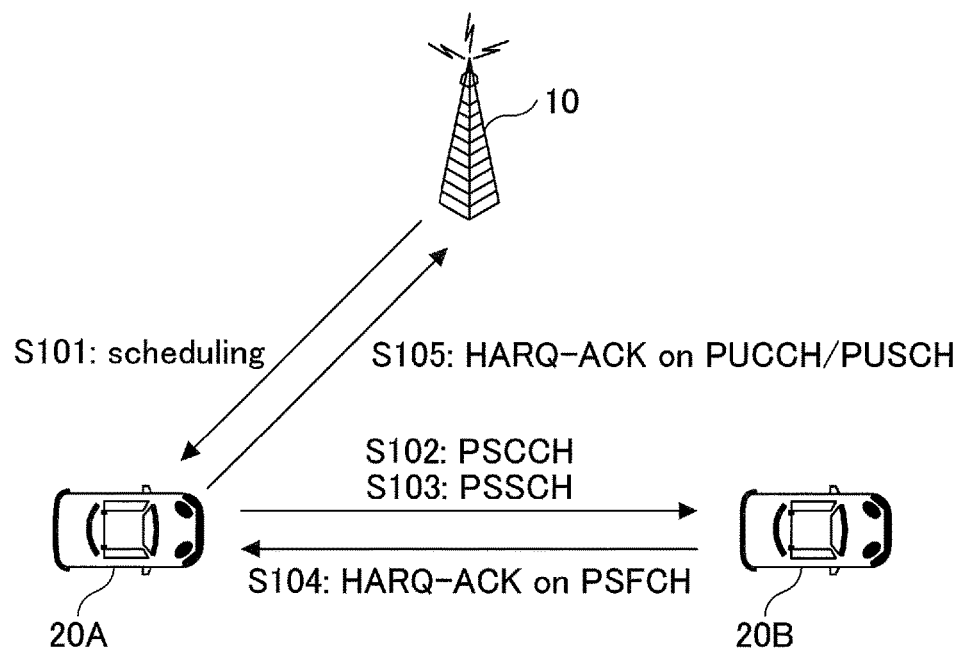
FIG. 10 is a diagram illustrating a configuration and an operation of the wireless communication system according to the Example 1.

FIG. 10 is a diagram illustrating a configuration (and an operation) of a wireless communication system according to the Example 1. The configuration itself is the same in Example 2.

As shown in FIG. 10, the wireless communication system according to the Example 1 includes a base station apparatus 10, a user equipment 20A, and a user equipment 20B. In practice, there are a number of user equipments, but FIG. 10 shows, as an example, a user equipment 20A and a user equipment 20B.

Hereinafter, when the user equipment 20A, 20B, or the like are not specifically distinguished, the term "user equipment 20" or "user equipment" is simply used. In FIG. 10, as an example, the user equipment 20A and the user equipment 20B are both within the cell coverage. However, the operation in Example 1 can be applied even when the user equipment 20B is outside the coverage.

As described above, in this embodiment, the user equipment 20 is, for example, a device mounted in a vehicle such as an automobile and has a function of cellular communication as a UE in an LTE or NR and a sidelink function. The user equipment 20 may be a conventional portable terminal (such as a smartphone). The user equipment 20 may also be an RSU. The RSU may be a UE-type RSU having the function of a UE or a gNB-type RSU having the function of a base station apparatus.

The user equipment 20 need not be a single housing device. For example, even when various sensors are distributed in a vehicle, the device including the various sensors is the user equipment 20.

Further, the processing contents of the transmission data of sidelink of the user equipment 20 are basically the same as the processing contents of the UL transmission in the LTE or NR. For example, the user equipment 20 scrambles the codeword of the transmission data, modulates it to generate complex-valued symbols, and maps the complex-valued symbols to one or two layers for precoding. The precoded complex-valued symbols are then mapped to resource elements to generate a transmission signal (e.g., complex-valued time-domain SC-FDMA signal) and transmit it from each antenna port.

The base station apparatus 10 has a function of cellular communication as a base station in the LTE or NR and a function of enabling communication of the user equipment 20 according to the present embodiment (e.g., resource pool configuration, resource allocation, etc.). The base station apparatus 10 may be an RSU (gNB-type RSU).

In the wireless communication system according to the Example 1, the signal waveform used by the user equipment 20 for SL or UL maybe OFDMA, SC-FDMA, or other signal waveform.

<Operation Example of Example 1>

An operation example of the wireless communication system according to the Example 1 will be described with reference to FIG. 10.

In S101, the base station apparatus 10 performs SL scheduling to the user equipment 20A by sending DCI (Downlink Control Information) via PDCCH. Thereafter, for convenience, the DCI for SL scheduling is called SL scheduling DCI.

The Example 1 also assumes that in S101, the base station apparatus 10 transmits a DCI for DL scheduling (which may be referred to as DL assignment) to the user equipment 20A by the PDCCH. Thereafter, for convenience, the DCI for DL scheduling is referred to as a DL scheduling DCI. The user equipment 20A that receives the DL scheduling DCI receives DL data over PDSCH using resources specified in the DL scheduling DCI.

In S102 and S103, the user equipment 20A transmits a SCI (Sidelink Control Information) by a PSCCH using the resource specified in the SL scheduling DCI and transmits SL data by a PSSCH. Note that in the SL scheduling DCI, only PSSCH resources may be specified. In this case, for example, the user equipment 20A may transmit the SCI (PSCCH) using a frequency resource adjacent to the PSSCH frequency resource with the same time resource as the PSSCH time resource.

The user equipment 20B receives the SCI (PSCCH) and the SL data (PSSCH) transmitted from the user equipment 20A. The SCI received by the PSCCH includes information about resources of a PSFCH for the user equipment 20B to transmit a HARQ-ACK for receipt of the data.

The information of the resource is included in the DL scheduling DCI or SL scheduling DCI transmitted from the base station apparatus 10 in S101, and the user equipment 20A acquires the information of the resource from the DL scheduling DCI or the SL scheduling DCI and includes it in the SCI. Alternatively, the DCI transmitted from the base station apparatus 10 does not include the information of the resource, and the user equipment 20A may autonomously include the information of the resource in the SCI and transmit the information of the resource.

In S104, the user equipment 20B transmits the HARQ-ACK for the received data to the user equipment 20A using the PSFCH resources specified in the received SCI.

In S105, the user equipment 20A transmits the HARQ-ACK using a PUCCH resource designated by the DL scheduling DCI (or the SL scheduling DCI) at a timing (for example, timing in units of slot) specified by the DL scheduling DCI (or the SL scheduling DCI), and the base station apparatus 10 receives the HARQ-ACK. The HARQ-ACK codebook may include a HARQ-ACK received from the user equipment 20B and a HARQ-ACK for DL data. However, HARQ-ACK for DL data is not included if DL data is not allocated.

<Example 1: Processing Content for HARQ-ACK Codebook>

Hereinafter, an example of the construction method of the HARQ-ACK codebook that the user equipment 20A transmits to the base station apparatus 10 will be described in more detail.

<Construction>

If the user equipment 20A receives the DL scheduling DCI and the SL scheduling DCI each containing a value of PDSCH/PDCCH-to-HARQ feedback timing indicator field, and if the value indicates the same slot for the DL scheduling DCI and the SL scheduling DCI, the user equipment 20A transmits HARQ-ACK for the DL data and HARQ-ACK for the SL data (HARQ-ACK received by the user equipment 20A from the user equipment 20B in S104) using the same PUCCH resource. That is, in this case, the user equipment 20A includes the HARQ-ACK for the DL data and the HARQ-ACK for the SL data (the HARQ-ACK received by the user equipment 20A in S104) in one HARQ-ACK codebook and transmits the HARQ-ACK codebook.

The "PDSCH/PDCCH-to-HARQ feedback timing indicator field" above indicates "PDSCH-to-HARQ feedback timing indicator field" or "PDCCH-to-HARQ feedback timing indicator field".

The "PDSCH-to-HARQ feedback timing indicator field" is a field included in the DL scheduling DCI, and the value indicates HARQ feedback timing (e.g., number of slots) from PDSCH (DL data) reception.

The "PDCCH-to-HARQ feedback timing indicator field" is a field included in the SL scheduling DCI whose value indicates HARQ feedback timing (e.g., number of slots) from reception of the PDCCH (SL scheduling DCI).

The above is an example and the DL scheduling DCI may include a "PDCCH-to-HARQ feedback timing indicator field" or the SL scheduling DCI may include a "PDSCH-to-HARQ feedback timing indicator field".

For example, the above-described processing may be replaced by "the user equipment 20A transmits HARQ-ACK for DL data and HARQ-ACK for SL data (HARQ-ACK received by the user equipment 20A in S104) using the same PUCCH resource if the DL scheduling DCI received by the user equipment 20A contains the value of PDSCH-to-HARQ feedback timing indicator field and the SL scheduling DCI contains the value of PDCCH-to-HARQ feedback timing indicator field, and these values show the same slot as a HARQ feedback timing."

Figure 11:
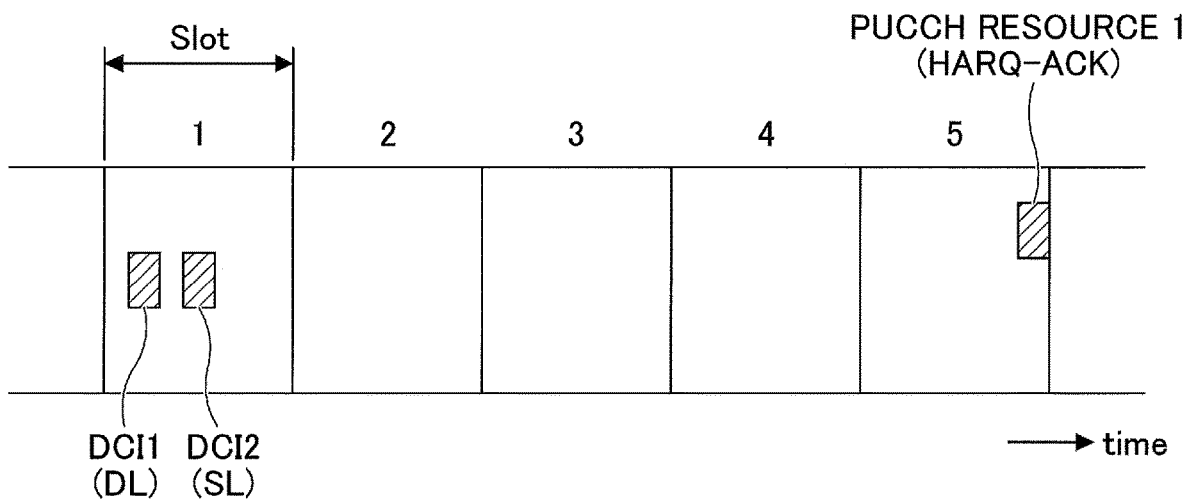
FIG. 11 shows a transmission example of the HARQ-ACK codebook.

FIG. 11 shows an example of DCI reception and HARQ-ACK transmission in the user equipment 20A. In FIG. 11, DCI 1 shows a DL scheduling DCI and DCI 2 shows a SL scheduling DCI. In FIG. 11, for example, the user equipment 20A receives the DCI1 and the DCI2 in the slot 1. When both of these represent slot 5 as HARQ feedback timing, the user equipment 20A uses PUCCH resource 1 to transmit to the base station apparatus 10 a HARQ-ACK codebook comprising a HARQ-ACK for DL data and a HARQ-ACK for SL data.

<HARQ-ACK Order>

There are following options A, B, and C regarding the order of HARQ-ACKs when user equipment 20 creates a HARQ-ACK codebook containing HARQ-ACK for DL data and HARQ-ACK for SL data.

Figure 12:
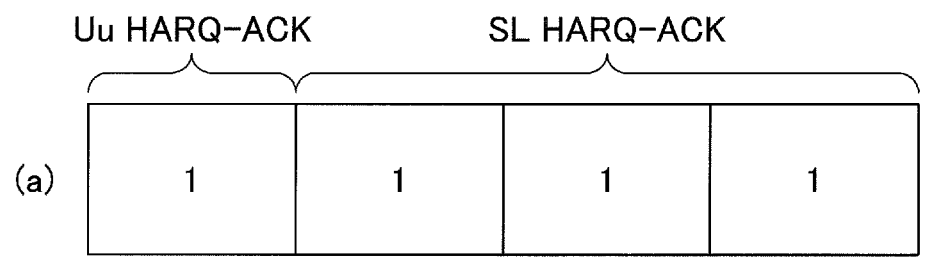
FIG. 12 shows an example of the order of HARQ-ACK.
Figure 12:
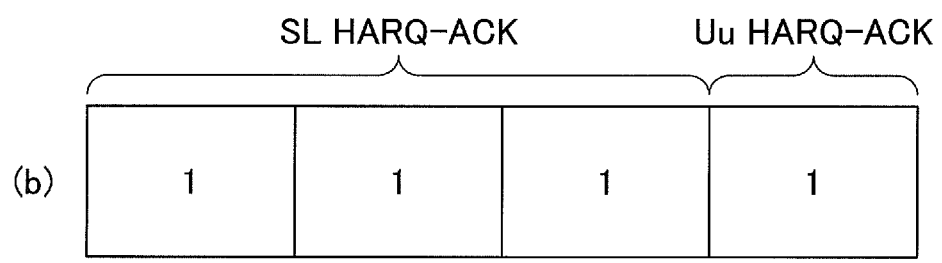

Option A) In Option A, HARQ-ACK for DL data (described as Uu HARQ-ACK in FIG. 12) is stored first and then HARQ-ACK (SL HARQ-ACK) for SL data is stored, as shown in FIG. 12(a).

Option B) In Option B, for example, the HARQ-ACK for SL data is stored first, followed by the HARQ-ACK for DL data, as shown in FIG. 12(b).

The example of FIG. 12 shows a case in which the HARQ-ACK codebook consists of 4-bit HARQ-ACK information bits, and a case in which all bits are 1 as an example. It is also assumed that the left end of the HARQ-ACK codebook shown in FIG. 12 is the first in the order in which the bits of the HARQ-ACK codebook are arranged, and the bits are arranged from the left end to the right. This is an example.

In the example of FIG. 12, it is assumed that the user equipment 20A transmits SL data (PSSCH) to a plurality of user equipments and receives HARQ-ACK for SL data from the plurality of user equipments.

When the user equipment 20A receives the HARQ-ACK for SL data from a plurality of user equipments and stores the HARQ-ACK from each user equipment in each bit of the HARQ-ACK codebook, the order in which the HARQ-ACK from the plurality of user equipments is arranged in the HARQ-ACK codebook is determined, for example, based on UE-ID of the plurality of user equipments (e.g., descending order of the IDs or ascending order of the IDs). Alternatively, when the user equipment 20A receives the SL scheduling DCI for each of the plurality of user equipments from the base station apparatus 10 for transmitting SL data to the plurality of user equipments, the order in which the HARQ-ACK from the plurality of user equipments is arranged in the HARQ-ACK codebook may be determined in the temporal order in which the SL scheduling DCI is received, or the order in which the HARQ-ACK from the plurality of user equipments is arranged in the HARQ-ACK code book may be determined in the temporal order in which each SCI is transmitted to the plurality of user equipments.

Option C) In Option C, instead of using a predetermined method of determining the order as described above, the order is designated in the DL scheduling DCI or the SL scheduling DCI received by the user equipment 20A and the order is determined according to the designation.

<On DAI>

Figure 13:
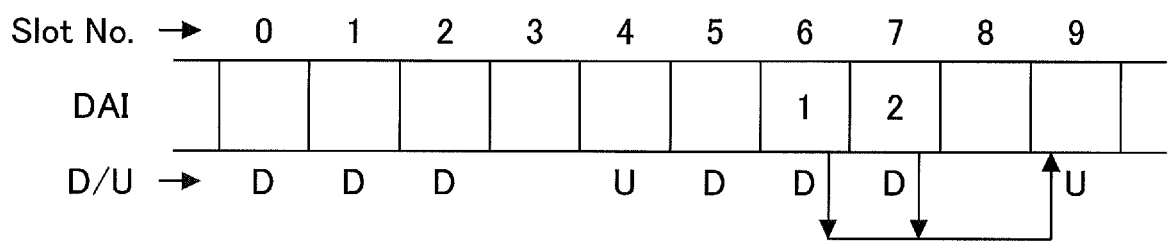
FIG. 13 is a diagram illustrating DAI.

The DL scheduling DCI (or SL scheduling DCI) includes a DAI (Downlink assignment index). FIG. 13 is a diagram illustrating an example of DAI. The example of FIG. 13 shows an example in which the configurations for the user equipment 20A are made to transmit HARQ-ACKs in slot 9 (UL) for the DL data received in slot 6 (DL) and the DL data received in slot 7 (DL). In this case, for example, the DCI for DL data assignment received in slot 6 includes 1 as a DAI, and the DCI for DL data assignment received in slot 7 includes 2 as a DAI. This allows the user equipment 20A to determine whether the DL data corresponding to the HARQ-ACK to be transmitted in the slot 9 has been received. For DAI, options D and E are listed below.

In option D) In option D, the SL scheduling DCI transmitted from the base station apparatus 10 to the user equipment 20A does not include DAI, and the DAI contained in the DL scheduling DCI is not associated with HARQ-ACK for SL data.

In this case, regarding the user equipment 20B that receives the SL data in the PSSCH, for example, the user equipment 20A may include the DAI for the SL data in the SCI that is transmitted in the PSCCH and the user equipment 20B acquires and uses the DAI from the SCI.

Option E) In option E, DAI is included in the SL scheduling DCI transmitted from the base station apparatus 10 to the user equipment 20A. The DAI is included in the SCI and transmitted by the PSCCH from the user equipment 20A to the user equipment 20B, and the user equipment 20B uses the DAI to perform HARQ-ACK transmission of SL. The user equipment 20A utilizes the DAI included in the DL scheduling DCI for transmission of HARQ-ACK for DL data.

<About PUCCH Resources>

For PUCCH resources, options F to H are provided below.

In option F) In Option F, in the user equipment 20A, a PUCCH resource for transmitting a HARQ-ACK codebook containing a HARQ-ACK for DL data and a HARQ-ACK for SL data (or including a HARQ-ACK for DL data or a HARQ-ACK for SL data) is determined by the last received DCI of a plurality of DL scheduling DCIs having a PDSCH-to-HARQ feedback timing indicator field specifying the same slot.

That is, for example, when the user equipment 20A receives DCI-A, DCI-B, and DCI-C as the DL scheduling DCI in this order, and when each of DCI-A, DCI-B, and DCI-C contains a value specifying the same slot as the PDSCH-to-HARQ feedback timing, the user equipment 20A transmits the HARQ-ACK code book using the PUCCH resources included in the DCI-C in the slot.

In option G) In option G, in the user equipment 20A, a PUCCH resource for transmitting HARQ-ACK codebook containing a HARQ-ACK for DL data and a HARQ-ACK for SL data (or including a HARQ-ACK for DL data or a HARQ-ACK for SL data) is determined by the last received DCI of a plurality of SL scheduling DCIs having PDSCH/PDCCH-to-HARQ feedback timing indicator field specifying the same slot.

That is, for example, when the user equipment 20A receives DCI-A, DCI-B, and DCI-C as SL scheduling DCI in this order, and when each of DCI-A, DCI-B, and DCI-C contains a value specifying the same slot as PDSCH/PDCH-to-HARQ feedback timing indicator field, the user equipment 20A transmits the HARQ-ACK code book in the slot using the PUCCH resource included in the DCI-C.

In option H) In option H, in the user equipment 20A, a PUCCH resource for transmitting HARQ-ACK codebook containing a HARQ-ACK for DL data and a HARQ-ACK for SL data (or including a HARQ-ACK for DL data or a HARQ-ACK for SL data) is determined by the last received DCI of one or more SL scheduling DCIs and one or more DL scheduling DCIs having a PDSCH/PDCCH-to-HARQ feedback timing indicator field specifying the same slot.

That is, for example, if the user equipment 20A receives DCI-A and DCI-B as SL scheduling DCI in this order, then DCI-C is received as DL scheduling DCI, and each of DCI-A, DCI-B, and DCI-C contains a value specifying the same slot as PDSCH/PDCH-to-HARQ feedback timing indicator field, the user equipment 20A transmits the HARQ-ACK codebook in the slot using a PUCCH resource included in the DCI-C.

Note that in the case of a conflict between PUCCH and PUSCH resources (when allocated to at least the same time resource), etc., the user equipment 20A may send the HARQ-ACK codebook with PUSCH resource without using PUCCH resource.

<Other Examples>

In the above example, the DCI transmitted from the base station apparatus 10 to the user equipment 20A includes information on a PSFCH resource used by the user equipment 20B to transmit a HARQ-ACK, and the SCI transmitted from the user equipment 20A includes information on the PSFCH resource.

Alternatively, neither the DL scheduling DCI nor the SL scheduling DCI transmitted from the base station apparatus 10 to the user equipment 20A contains PSFCH resource information, and the SCI transmitted from the user equipment 20A does not contain PSFCH resource information.

In this case, for example, the user equipment 20B that receives the SCI corresponding to the SL data autonomously selects a PSFCH resource and transmits the HARQ-ACK for the SL data to the user equipment 20A using the selected resource.

The user equipment 20A may also indicate whether a PSFCH resource is specified or not by a value of PSFCH resource indicator (abbreviated as PRI) included in the SCI sent to the user equipment 20B.

As an example, when PRI=000, the user equipment 20B determines that no PSFCH resource is specified and autonomously selects the resource. For example, if the PRI is a value greater than 000 (e.g., 010), the user equipment 20B selects the corresponding PSFCH resource and uses it to transmit the HARQ-ACK for the SL data.

(Example 2)

Next, Example 2 will be described. The configuration of the wireless communication system according to the Example 2 is as described in the Example 1.

In the Example 2, in the sidelink transmission mode 1 illustrated in FIG. 2, the user equipment 20B that received SL data by a PSSCH transmits a HARQ-ACK for the SL data to the base station apparatus 10 using a PUCCH.

<Example of Operation of Example 2>

An operation example of the wireless communication system according to the Example 2 will be described with reference to FIG. 14.

In S201, the base station apparatus 10 performs SL scheduling by sending SL scheduling DCI to the user equipment 20A by a PDCCH.

In S202 and S203, the user equipment 20A transmits a SCI by the PSCCH using the resource specified by the SL scheduling DCI and transmits the SL data by a PSSCH. Note that in SL scheduling DCI, only a PSSCH resource may be specified. In this case, for example, the user equipment 20A may transmit the SCI (PSCCH) using a frequency resource adjacent to the PSSCH frequency resource with the same time resource as the PSSCH time resource.

The user equipment 20B receives the SCI (PSCCH) and SL data (PSSCH) transmitted from the user equipment 20A.

The SCI received by the PSCCH from the user equipment 20A includes information on PUCCH resource for the user equipment 20B to transmit the HARQ-ACK corresponding to the reception of the SL data to the base station apparatus 10.

The information of the resource is included in the DL scheduling DCI or SL scheduling DCI transmitted from the base station apparatus 10 in S201, and the user equipment 20A acquires the information of the resource from the DL scheduling DCI or the SL scheduling DCI and includes it in the SCI. Alternatively, the DCI transmitted from the base station apparatus 10 does not include the information of the resource, and the user equipment 20A may autonomously include the information of the resource in the SCI and transmit the information of the resource.

In S204, the user equipment 20B transmits the HARQ-ACK using the PUCCH resource designated by the information included in the SCI at a time specified by the information included in the SCI (for example, the timing in slot units). The base station apparatus 10 receives the HARQ-ACK. The HARQ-ACK codebook may include, for example, a HARQ-ACK for SL data received by the user equipment 20B and a HARQ-ACK for DL data received by the user equipment 20B from the base station apparatus 10. However, the HARQ-ACK for DL data is not included if DL data is not allocated.

Figure 14:
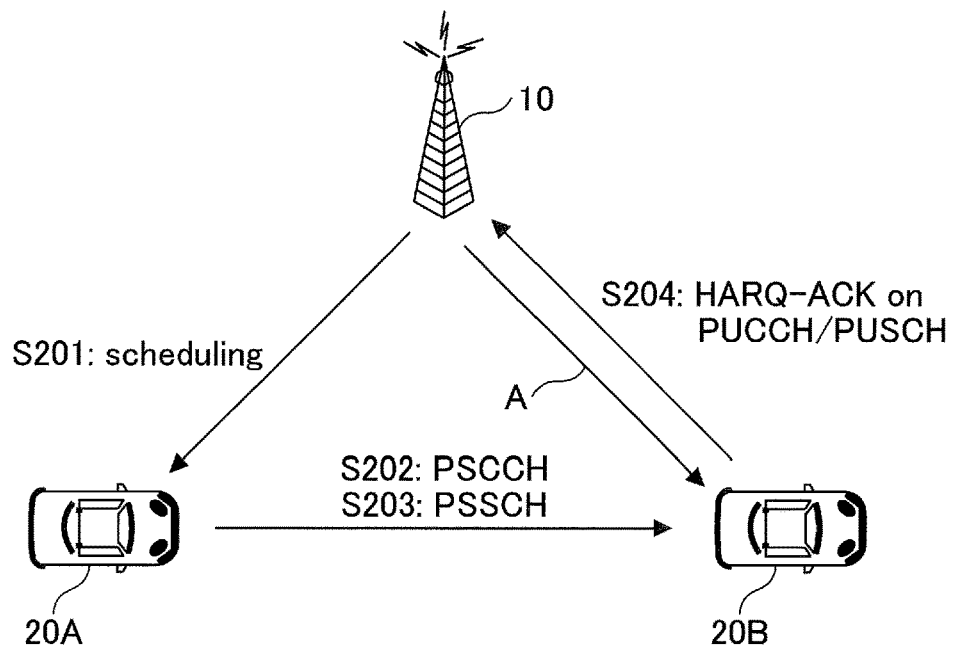
FIG. 14 is a diagram illustrating a configuration and an operation of the wireless communication system according to the Example 2.

In the Example 2, as shown in line A of FIG. 14, the user equipment 20B receives the DL scheduling DCI from the base station apparatus 10. As noted above, instead of specifying PUCCH resource for HARQ-ACK transmission by the SCI, the DL scheduling DCI may specify the PUCCH resource for HARQ-ACK transmission.

<Example 2: HARQ-ACK Codebook Process Content>

Hereinafter, a configuration method of a HARQ-ACK codebook transmitted to the base station apparatus 10 by the user equipment 20B will be described in more detail. In the following description, the DL scheduling DCI is a DL scheduling DCI that the user equipment 20B receives from the base station apparatus 10. In the following description, "DCl/SCI" is defined as a SCI that includes information included in a DCI (DL scheduling DCI or SL scheduling DCI) that the user equipment 20A receives from the base station apparatus 10, or a SCI that does not include information included in DCI that the user equipment 20A receives from the base station apparatus 10 (when the user equipment 20A autonomously includes information in the SCI).

<Construction>

If the user equipment 20B receives the DL scheduling DCI and the DCl/SCI each containing a value of PDSCH/PDCCH-to-HARQ feedback timing indicator field, and the value indicates the same slot for both the DL scheduling DCI and the DCl/SCI, the user equipment 20B transmits a HARQ-ACK for the DL data and a HARQ-ACK for the SL data using the same PUCCH resource. That is, in this case, the user equipment 20B includes the HARQ-ACK for the DL data and the HARQ-ACK for the SL data in one HARQ-ACK codebook and transmits the HARQ-ACK codebook.

The foregoing statement maybe replaced by, for example, "the user equipment 20B sends a HARQ-ACK for DL data and a HARQ-ACK for SL data using the same PUCCH resource if the DL scheduling DCI received by the user equipment 20B contains the value of PDSCH-to-HARQ feedback timing indicator field and DCl/SCI contains the value of PDCCH-to-HARQ feedback timing indicator field, and these values show the same slot as HARQ feedback timing."

<HARQ-ACK Order>

There are the following options A, B, and C regarding the order of HARQ-ACKs when the user equipment 20B creates a HARQ-ACK codebook containing a HARQ-ACK for DL data and a HARQ-ACK for SL data.

Option A) In Option A, the user equipment 20B first stores a HARQ-ACK for DL data (described as Uu HARQ-ACK in FIG. 12) and then stores a HARQ-ACK (SL HARQ-ACK) for SL data, as shown in FIG. 12(a).

Option B) In Option B, for example, the user equipment 20B stores the HARQ-ACK for SL data first, followed by the HARQ-ACK for DL data, as shown in FIG. 12(b).

As described above, in the example of FIG. 12, the case in which the HARQ-ACK codebook consists of 4-bit HARQ-ACK information bits, and the case in which all bits are 1 is shown as an example. It is also assumed that the left end of the HARQ-ACK code book shown in FIG. 12 is the first in the order in which the bits of the HARQ-ACK code book are arranged, and the bits are arranged from the left end to the right. This is an example.

In the example of FIG. 12 in the Example 2, it is assumed that the user equipment 20B receives SL data (PSSCH) from a plurality of user equipments and transmits HARQ-ACK corresponding to SL data from the plurality of user equipments.

When the user equipment 20B stores a plurality of HARQ-ACKs for SL data from a plurality of user equipments in the HARQ-ACK codebook, the order in which HARQ-ACKs are arranged in the HARQ-ACK codebook is determined, for example, based on the UE-ID of the plurality of user equipments (for example, in descending order in the ID or in ascending order in the ID). Alternatively, the user equipment 20B may determine the order in which HARQ-ACKs for the SL data are arranged in the HARQ-ACK codebook in the order (temporal order) in which the DCl/SCI is received corresponding to the SL data from each of the plurality of user equipments.

In the option C) In option C, the order is designated in the DL scheduling DCI or the DCI/SCI received by the user equipment 20B and the order is determined according to the designation, instead of the predetermined order determination method as described above.

<For DAI>

For DAI in Example 2, there are options D and E as follows.

Option D) In option D, the DCI/SCI received by the user equipment 20B from the user equipment 20A does not include DAI, and the DAI contained in the DL scheduling DCI is not associated with the HARQ-ACK for SL data.

Option E) In Option E, DAI is included in a DCI/SCI received by the user equipment 20B from the user equipment 20A. The user equipment 20B performs HARQ-ACK transmission of SL using the DAI. The user equipment 20B also utilizes the DAI included in the DL scheduling DCI for transmitting the HARQ-ACK for the DL data.

<About PUCCH Resources>

For PUCCH resources, options F to H are provided below.

Option F) In Option F, in user equipment 20A, a PUCCH resource for transmitting a HARQ-ACK codebook containing a HARQ-ACK for DL data and a HARQ-ACK for SL data (or including a HARQ-ACK for DL data or a HARQ-ACK for SL data) is determined by the last received DCI of a plurality of DL scheduling DCIs having a PDSCH-to-HARQ feedback timing indicator field specifying the same slot.

That is, for example, when the user equipment 20B receives the DCI-A, the DCI-B, and the DCI-C as the DL scheduling DCI in this order, and when the values specifying the same slot as the PDSCH-to-HARQ feedback timing are included in each of the DCI-A, the DCI-B, and the DCI-C, the user equipment 20B transmits the HARQ-ACK codebook using the PUCCH resource included in the DCI-C in the slot.

Option G) In option G, in the user equipment 20B, a PUCCH resource for transmitting a HARQ-ACK codebook containing a HARQ-ACK for DL data and a HARQ-ACK for SL data (or including a HARQ-ACK for DL data or a HARQ-ACK for SL data) is determined by the last received DCI/SCI of a plurality of DCI/SCI having a PDSCH/PDCCH-to-HARQ feedback timing field specifying the same slot.

That is, for example, when the user equipment 20B receives DCI/SCI-A, DCI/SCI-B, and DCI/SCI-C in this order, and when each of DCI/SCI-A, DCI/SCI-B, and DCI/SCI-C contains a value specifying the same slot as PDSCH/PDCCH-to-HARQ feedback timing indicator field, the user equipment 20B transmits the HARQ-ACK code book in the same slot using a PUCCH resource included in DCI/SCI-C.

Option H) In Option H, in the user equipment 20B, a PUCCH resource for transmitting a HARQ-ACK code book containing HARQ-ACK for DL data and HARQ-ACK for SL data (or including HARQ-ACK for DL data or HARQ-ACK for SL data) is determined by the last received one (DL scheduling DCI or DCI/SCI) in one or more DL scheduling DCIs and one or more DCI/SCIs having a PDSCH/PDCCH-to-HARQ feedback timing indicator field specifying the same slot.

That is, for example, when the user equipment 20B receives DCI/SCI-A and DCI/SCI-B as DCI/SCI in this order, then receives DCI-C as DL scheduling DCI, and when each of DCI/SCI-A, DCI/SCI-B, and DCI-C contains a value specifying the same slot as PDSCH/PDCCH-to-HARQ feedback timing indicator field, the user equipment 20B transmits a HARQ-ACK codebook using a PUCCH resource included in DCI-C in the slot.

Note that in the case of a conflict between PUCCH and PUSCH resources (when allocated to at least the same time resource), etc., the user equipment B may send a HARQ-ACK codebook using a PUS CH resource without using the PUCCH resource.

(Example 3)

In the Example 3, the operation of the Example 1 and the operation of the Example 2 are switched based on predetermined information. Examples of predetermined information include options 1 to 7 below.

Option 1) In Option 1, the predefined information is a DCI format. As an example, in the configuration shown in FIGS. 10 and 14, when the user equipment 20A and the user equipment 20B receive a DCI of the DCI format A from the base station apparatus 10, the user equipment 20A and the user equipment 20B perform the operation shown in the Example 1. When the user equipment 20A and the user equipment 20B receive a DCI of the DCI format B from the base station apparatus 10, the user equipment 20A and the user equipment 20B perform the operation shown in the Example 2.

Option 2) In option 2, the predetermined information is a SL transmission mode. For example, the operation of Example 1 is performed in the case of the SL transmission mode 1, and the operation of Example 2 is performed in the case of the SL transmission mode 2d.

Option 3) In Option 3, the predefined information is a PUCCH resource specified to send a HARQ-ACK. As an example, in the configuration shown in FIGS. 10 and 14, when the user equipment 20A and the user equipment 20B receive a value corresponding to 0000 to 0111 as the value of the PUCCH resource indicator field from the base station apparatus 10, the user equipment 20A and the user apparatus 20B perform the operation shown in the Example 1. When the user equipment 20A and the user equipment 20B receive from the base station apparatus 10 a value corresponding to 1000 to 1111 as the value of the PUCCH resource indicator field, the user equipment 20A and the user equipment 20B perform the operation shown in the Example 2.

Option 4) In Option 4, the predetermined information is a CORSET/CCE index specified in the DL or SL or UL scheduling DCI.

Option 5) In Option 5, the predetermined information is a higher layer parameter. As an example, in the configuration shown in FIGS. 10 and 14, when the user equipment 20A and the user equipment 20B receive a parameter A from the base station apparatus 10 by signaling of the higher layer (MAC, RRC, or the like), the user equipment 20A and the user equipment 20B perform the operation shown in the Example 1. When the user equipment 20A and the user equipment 20B receive a parameter B from the base station apparatus 10 in the signaling of the layer (MAC, RRC, or the like), the user equipment 20A and the user equipment 20B perform the operation shown in the Example 2.

Option 6) In option 6, the predetermined information is a communication type (unicast or groupcast). For example, when SL communication is performed by unicast (or groupcast) between a plurality of user equipments 20, each user equipment 20 performs the operation according to the Example 1. For example, when SL communication is performed by groupcast (or unicast) between a plurality of user equipments 20, each user equipment 20 performs the operation according to the Example 2.

Option 7) In Option 7, the predetermined information is an Indicator included in the DCI or SCI. For example, each user equipment 20 determines whether to perform the operation of the Example 1 or the operation of the Example 2 based on the information specified by the indicator included in the DCI received from the base station apparatus 20 or the SCI received from other user equipments 20.

Next, examples 4 and 5 will be described. The operation of Example 3 can also be applied to the switching of the operation of Example 4 and that of Example 5. When the switching operation of Example 3 is applied to the switching operation of Example 4 and Example 5, Example 1 is replaced by Example 4 and Example 2 is replaced by Example 5 in Example 3.

(Example 4)

The Example 4 corresponds to an embodiment in which the SL transmission mode is changed from 1 to 2d in Example 1, and the base station apparatus 10 in Example 1 is replaced by a header UE (user equipment 20C).

Also, the DCI is replaced by SCI and the DL scheduling is replaced by SL scheduling from the header UE (user equipment 20C) to the user equipment 20A. SL scheduling by DCI is also replaced by SL scheduling between the user equipment 20A and the user equipment 20B by SCI. PUCCH is also replaced by PSFCH.

<Example Configuration of Example 4>

Figure 15:
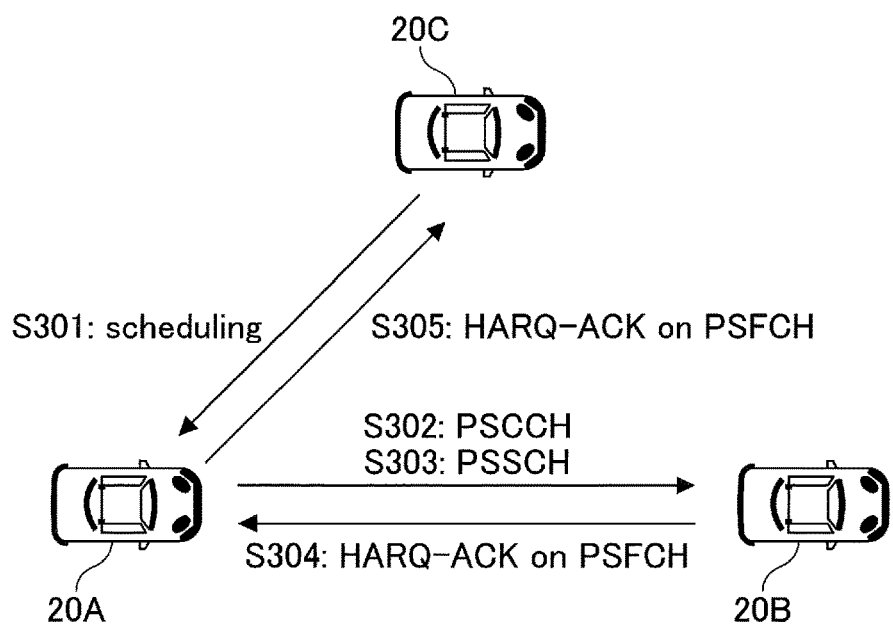
FIG. 15 is a diagram illustrating a configuration and an operation of the wireless communication system according to the Example 3.

FIG. 15 is a diagram illustrating a configuration (and an operation) of a wireless communication system according to the Example 4. The configuration itself is the same in Example 5.

As shown in FIG. 15, the wireless communication system according to the Example 4 includes a user equipment 20C, a user equipment 20A, and a user equipment 20B. Although there are actually many user equipments, FIG. 15 shows the user equipment 20A, the user equipment 20B, and the user equipment 20C as examples.

<Operation Example of Example 4>

An operation example of the wireless communication system of the Example 4 will be described with reference to FIG. 15.

In S301, the user equipment 20C performs SL scheduling for transmitting SL data from the user equipment 20A to the user equipment 20B by sending a SCI to the user equipment 20A by a PSCCH.

In this example 1, it is also assumed that the user equipment 20C transmits the SL scheduling SCI for transmitting the SL data from the user equipment 20C to the user equipment 20A by the PSCCH to the user equipment 20A in S301. For convenience, the SCI for SL scheduling for transmission of SL data from the user equipment 20C to the user equipment 20A is referred to as H-SCI. The SCI for SL scheduling for transmitting SL data from the user equipment 20A to the user equipment 20B is called S-SCI. The user equipment 20A that received the H-SCI receives the SL data by the PSSCH using the resource specified by the H-SCI.

In S302 and S303, the user equipment 20A transmits the SCI by the PSCCH and transmits the SL data by the PSSCH, using the resources specified by the S-SCI. In the case of S-SCI, only the resources of PSSCH maybe specified. In this case, for example, the user equipment 20A may transmit the SCI (PSCCH) using frequency resources adjacent to the PSSCH frequency resources with the same time resources as the PSSCH time resources.

The user equipment 20B receives the SCI (PSCCH) and SL data (PSSCH) transmitted from the user equipment 20A. The SCI received by the PSCCH includes information about a resource of the PSFCH for the user equipment 20B to transmit a HARQ-ACK corresponding to receipt of the data. However, as described in the Example 1, the user equipment 20B may select a PSFCH resource autonomously without including the information of the PSFCH resource.

The information of the resource is included in the H-SCI or S-SCI transmitted from the user equipment 20C in S301, and the user equipment 20A acquires the information of the resource from the H-SCI or S-SCI and includes it in the SCI that is transmitted to the user equipment 20B. Alternatively, the SCI transmitted from the user equipment 20C does not include the information of the resource, and the user equipment 20A may autonomously include the information of the resource in the SCI and transmit the information of the resource.

In S304, the user equipment 20B transmits the HARQ-ACK for the received data to the user equipment 20A using the PSFCH resource specified in the received SCI.

In S305, the user equipment 20A transmits a HARQ-ACK using the PSFCH resource specified by H-SCI (or S-SCI), for example, at the timing specified by H-SCI (or S-SCI) (e.g., timing in units of slots). The HARQ-ACK codebook may include a HARQ-ACK received from the user equipment 20B and a HARQ-ACK for SL data received from the user equipment 20C. However, when there is no assignment by H-SCI, the HARQ-ACK for SL data received from the user equipment 20C is not included.

Also as to "Process content on HARQ-ACK Codebook", the operation of Example 1 with the above-described substitution can be applied.

(Example 5)

Example 5 corresponds to an embodiment in which the SL transmission mode is changed from 1 to 2d in Example 2, and the base station apparatus 10 in Example 2 is replaced by a header UE (user equipment 20C).

Also, the DCI is replaced by SCI and the DL scheduling is replaced by SL scheduling from the header UE (user equipment 20C) to the user equipment 20B. SL scheduling by DCI is also replaced by SL scheduling between the user equipment 20A and the user equipment 20B by SCI. PUCCH is also replaced by PSFCH.

Figure 16:
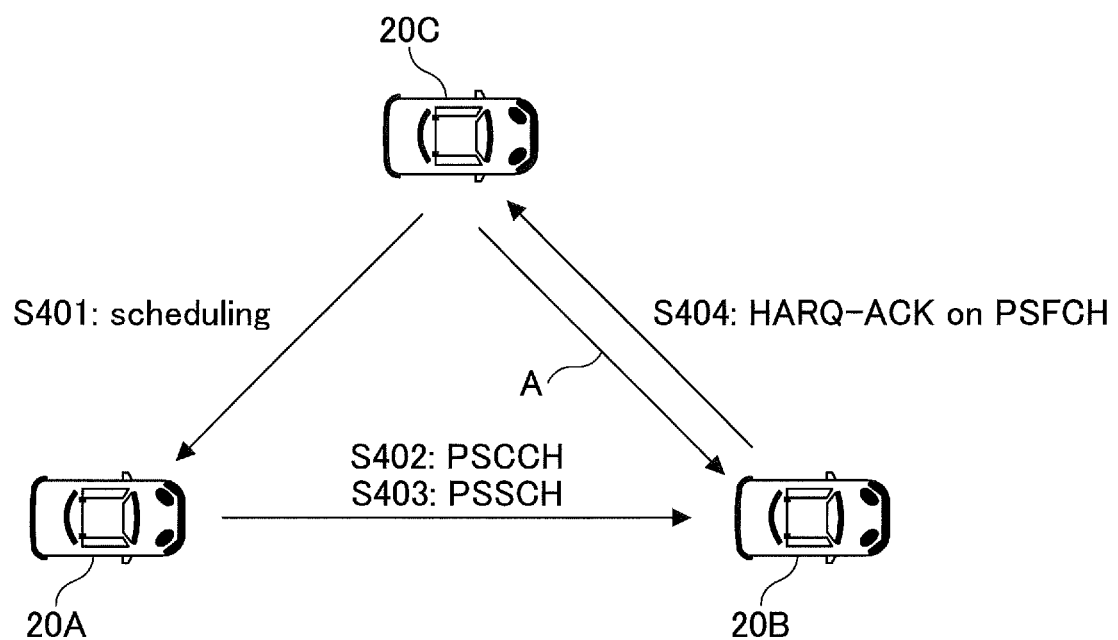
FIG. 16 is a diagram illustrating the configuration and operation of the wireless communication system according to the Example 4.

FIG. 16 is a diagram illustrating the configuration (and operation) of the wireless communication system according to the Example 5. The configuration of the wireless communication system according to the Example 5 is the same as that according to the Example 4 shown in FIG. 15.

<Operation Example of Example 5>

An operation example of the wireless communication system of the Example 5 will be described with reference to FIG. 16. For convenience, the SCI of SL scheduling for transmitting SL data from the user equipment 20C to the user equipment 20A (or the user equipment 20B) is referred to as H-SCI. The SCI of SL scheduling for transmitting SL data from the user equipment 20A to the user equipment 20B is referred to as S-SCI.

In S401, the user equipment 20C performs SL scheduling for transmitting SL data from the user equipment 20A to the user equipment 20B by sending S-SCI to the user equipment 20A through PSCCH.

In S402 and S403, the user equipment 20A transmits the SCI by the PSCCH and transmits the SL data by the PSSCH, using the resource specified by the S-SCI. In the case of S-SCI, only the resource of PSSCH maybe specified. In this case, for example, the user equipment 20A may transmit the SCI (PSCCH) using a frequency resource adjacent to the PSSCH frequency resource with the same time resource as the PSSCH time resource.

The user equipment 20B receives the SCI (PSCCH) and SL data (PSSCH) transmitted from the user equipment 20A.

The SCI received by the PSCCH from the user equipment 20A includes information on the resource of the PSFCH for the user equipment 20B to transmit the HARQ-ACK to the user equipment 20C for reception of the SL data.

The information of the resource is included in the H-SCI or S-SCI transmitted from the user equipment 20C in S401, and the user equipment 20A acquires the information of the resource from the H-SCI or S-SCI and includes it in the SCI. Alternatively, the SCI transmitted from the user equipment 20C does not include the information of the resource, and the user equipment 20A may autonomously include the information of the resource in the SCI and transmit the information of the resource.

In S404, the user equipment 20B transmits a HARQ-ACK to the user equipment 20C using the PSFCH resource designated by the information at a timing (for example, a timing in units of slots) specified by the information included in the received SCI. The HARQ-ACK codebook may include, for example, a HARQ-ACK for SL data received by user equipment 20B and a HARQ-ACK for SL data received by user equipment 20B from the user equipment 20C. However, when SL data is not allocated from the user equipment 20C, the HARQ-ACK for SL data from user equipment 20C is not included.

In Example 5, as shown in line A of FIG. 16, the user equipment 20B receives the H-SCI from the user equipment 20C. As described above, instead of specifying a PSFCH resource for HARQ-ACK transmission by the SCI received from the user equipment 20A, the H-SCI may specify a PSFCH resource for HARQ-ACK transmission.

Also as to "Process content on HARQ-ACK Codebook", the operation of Example 1 with the above-described substitution can be applied.

The user equipment 20C (header UE) described in the Example 4 and Example 5 may be replaced by a device, such as a node having a scheduling capability, a scheduling UE, a local manager, or the like.

The user equipment 20C (header UE), the node having scheduling capability, the scheduling UE, the local manager, and the base station apparatus 10 may be collectively referred to as a "communication apparatus." The user equipments 20A and 20B may also be referred to as a "communication apparatus."

(Example 6: Other Examples for Examples 1-5)

In the above-described Examples 1 to 3, the user equipment 20 (for example, the user equipment 20A of the Example 1) receiving the plurality of SL scheduling DCIs may include a plurality of HARQ-ACKs corresponding to each SL data in the same HARQ-ACK codebook and transmit it to the base station apparatus 10 using PUCCH resources, even when the plurality of SL scheduling DCIs are DCIs for SL scheduling between a plurality of different user equipments.

The "Process content on the HARQ-ACK codebook" described in each Example can be applied even when there is no DL scheduling from the base station apparatus 10 (or SL scheduling by H-SCI from the user equipment 20C).

In this case, the "Construction", "HARQ-ACK Order", and "PUCCH Resource" are as follows.

<Construction>

If one or more SL scheduling DCIs (or S-SCIs) received by the user equipment 20 contains a value of PDSCH/PDCCH-to-HARQ feedback timing indicator field, and the value indicates the same slot in each DCI/S-SCI, the user equipment 20 transmits each HARQ-ACK for the data corresponding to the scheduling using the same PUCCH resource (or PSFCH resource). That is, each HARQ-ACK is included in a single HARQ-ACK codebook and transmitted with that resource.

<HARQ-ACK Order>

The order in which each HARQ-ACK is ordered in the HARQ-ACK codebook is determined, for example, by the temporal order in which the DCI (or SCI) that schedules the data corresponding to each HARQ-ACK is received.

<PUCCH Resource (or PSFCH Eesource to User Equipment 20C)>

In the user equipment 20, a PUCCH resource for transmitting a HARQ-ACK codebook containing a HARQ-ACK for SL data is determined by the last received DCI (or S-SCI) of a plurality of SL scheduling DCIs (or S-SCIs) having PDSCH/PDCCH-to-HARQ feedback timing indicator field specifying the same slot.

That is, for example, when the user equipment 20 receives DCI-A, DCI-B, and DCI-C as SL scheduling DCI in this order, and when each of DCI-A, DCI-B, and DCI-C contains a value specifying the same slot as PDSCH/PDCCH-to-HARQ feedback timing, the user equipment 20 transmits the HARQ-ACK codebook using the PUCCH resource included in the DCI-C in the slot.

(Apparatus Configuration)

Next, a functional configuration example of the base station apparatus 10 and the user equipment 20 that perform the processes and operations described above will be described. The base station apparatus 10 and the user equipment 20 include functions to implement all of the Examples described above. However, the base station apparatus 10 and the user equipment 20 may each comprise only some of the functions in the Examples.

<Base Station Equipment 10>

Figure 17:
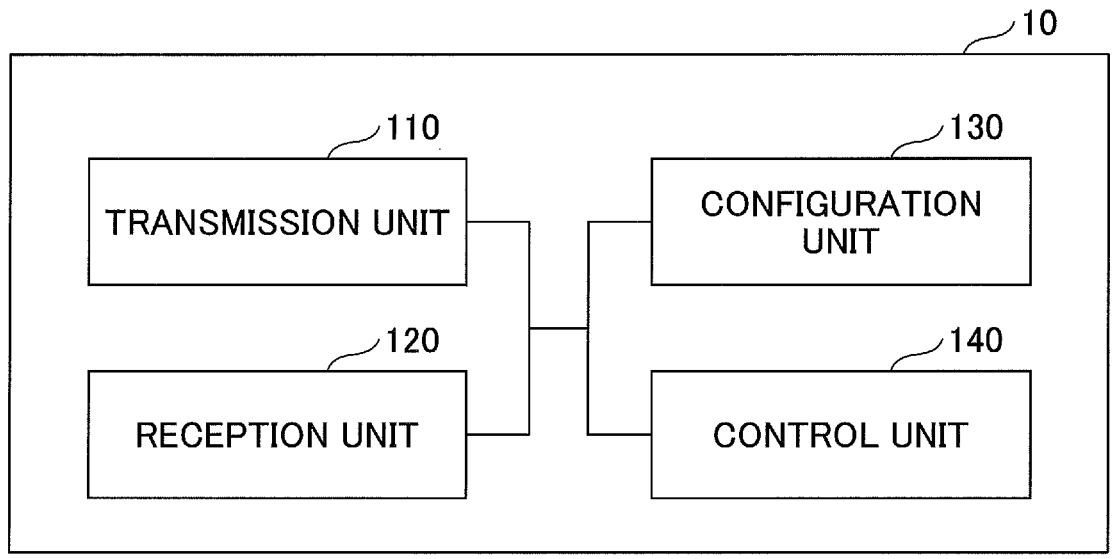
FIG. 17 is a diagram illustrating an example of a functional configuration of the base station apparatus 10 according to an embodiment of the present invention.

FIG. 17 is a diagram illustrating an example of a functional configuration of the base station apparatus 10. As shown in FIG. 17, the base station apparatus 10 includes a transmission unit 110, a reception unit 120, a configuration unit 130, and a control unit 140. The functional configuration shown in FIG. 17 is only one example. If the operation according to the embodiments of the present invention can be performed, the functional category and the name of the functional unit may be any one.

The transmission unit 110 includes a function for generating a signal to be transmitted to the user equipment 20 side and transmitting the signal wirelessly. The receiving unit 120 includes a function for receiving various signals transmitted from the user equipment 20 and acquiring, for example, information of a higher layer from the received signals. The transmission unit 110 has a function to transmit NR-PSS, NR-SSS, NR-PBCH, DL/UL control signals, DL reference signals, and the like to the user equipment 20. The transmitter unit 110 and the receiver unit 120 maybe referred to as a transmitter and a receiver, respectively.

The configuration unit 130 stores the preset configuration information and various configuration information to be transmitted to the user equipment 20 in the storage device and reads the preset configuration information from the storage device if necessary. The contents of the configuration information are, for example, information pertaining to the configuration of D2D communication.

The control unit 140 performs processing pertaining to the configuration in which the user equipment 20 performs D2D communication. The control unit 140 transmits the scheduling information of the D2D communication to the user equipment 20 through the transmission unit 110. A function unit related to signal transmission in the control unit 140 may be included in the transmission unit 110, and a function unit related to signal reception in the control unit 140 may be included in the receiving unit 120.

<User Equipment 20>

Figure 18:
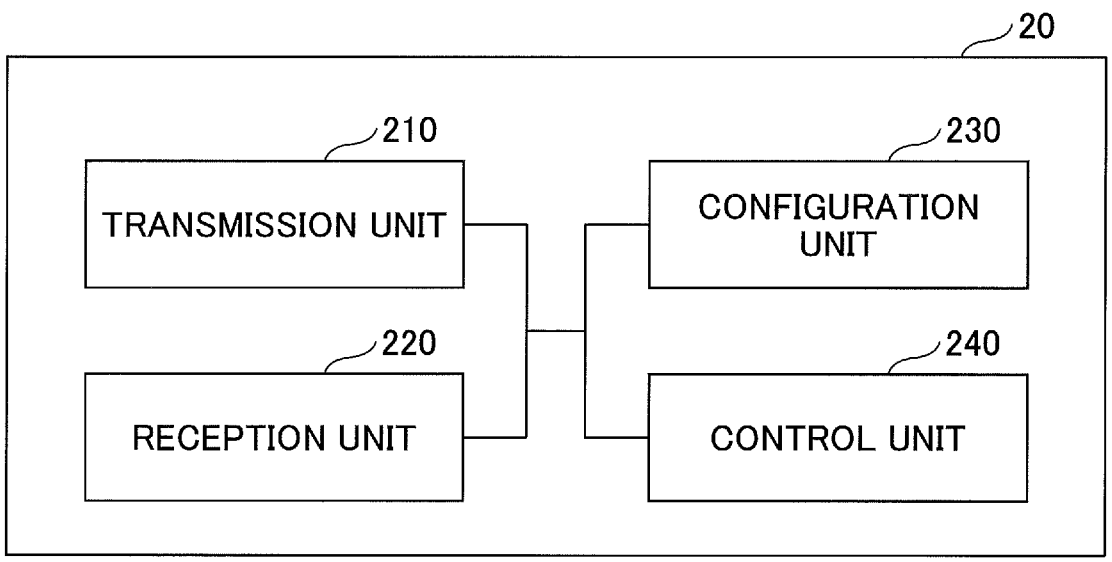
FIG. 18 is a diagram illustrating an example of a functional configuration of a user equipment 20 according to an embodiment of the present invention.

FIG. 18 is a diagram illustrating an example of a functional configuration of a user equipment 20. As shown in FIG. 18, the user equipment 20 includes a transmission unit 210, a reception unit 220, a configuration unit 230, and a control unit 240. The functional configuration shown in FIG. 18 is only one example. If the operation according to the embodiments of the present invention can be performed, the functional category and the name of the functional unit may be any one.

The transmission unit 210 creates a transmission signal from the transmission data and wirelessly transmits the transmission signal. The receiving unit 220 receives various signals wirelessly and acquires signals from higher layers from the received signal of the physical layer. The receiving unit 220 has a function to receive NR-PSS, NR-SSS, NR-PBCH, DL/UL/SL control signals or reference signals transmitted from the base station apparatus 10. For example, the transmitting unit 210 transmits PSCCH (Physical Sidelink Control Channel), PSSCH (Physical Sidelink Shared Channel), PSDCH (Physical Sidelink Discovery Channel), PSBCH (Physical Sidelink Broadcast Channel), and the like to another user equipment 20 as D2D communication, and the receiving unit 220 receives PSCCH, PSSCCH, PSDCH, or PSBCH from another user equipment 20. The transmitter unit 210 and the receiver unit 220 may be called a transmitter and a receiver, respectively.

The configuration unit 230 stores various configuration information received from the base station apparatus 10 or the user equipment 20 by the receiving unit 220 in the storage device and reads it from the storage device as necessary. The configuration unit 230 also stores the preset configuration information. The contents of the configuration information are, for example, information pertaining to the configuration of D2D communication.

The control unit 240 controls D2D communication with other user equipments 20. The control unit 240 may schedule D2D communication to other user equipments 20. A function unit related to signal transmission in the control unit 240 may be included in the transmission unit 210, and a function unit related to signal reception in the control unit 240 may be included in the receiving unit 220.

(Hardware Configuration)

The block diagrams (FIG. 17 and FIG. 18) used in the description of the above-mentioned embodiment illustrate the blocks of the function units. The functional blocks (configuration units) are implemented by at least one of any combinations of hardware and software. A method for implementing each functional block is not particularly limited. That is, each functional block may be implemented by using one apparatus that is physically or logically coupled or by connecting two or more apparatuses which are physically or logically separated from each other directly or indirectly (for example, wirelessly or in a wired manner) and using the plurality of apparatuses. The functional blocks may be implemented by combining software with the one apparatus or the plurality of apparatuses.

The functions include judgment, decision, determination, computation, calculation, processing, derivation, investigation, search, confirmation, reception, transmission, output, access, resolution, selection, choice, establishment, comparison, assumption, expectation, consideration, broadcasting, notifying, communicating, forwarding, configuring, reconfiguring, allocating, mapping, and assigning. However, the functions are not limited thereto. For example, a functional block (configuration unit) having a transmission function is referred to as a transmitting unit or a transmitter. In any case, as described above, a method for implementing the functional block is not particularly limited.

Figure 19:
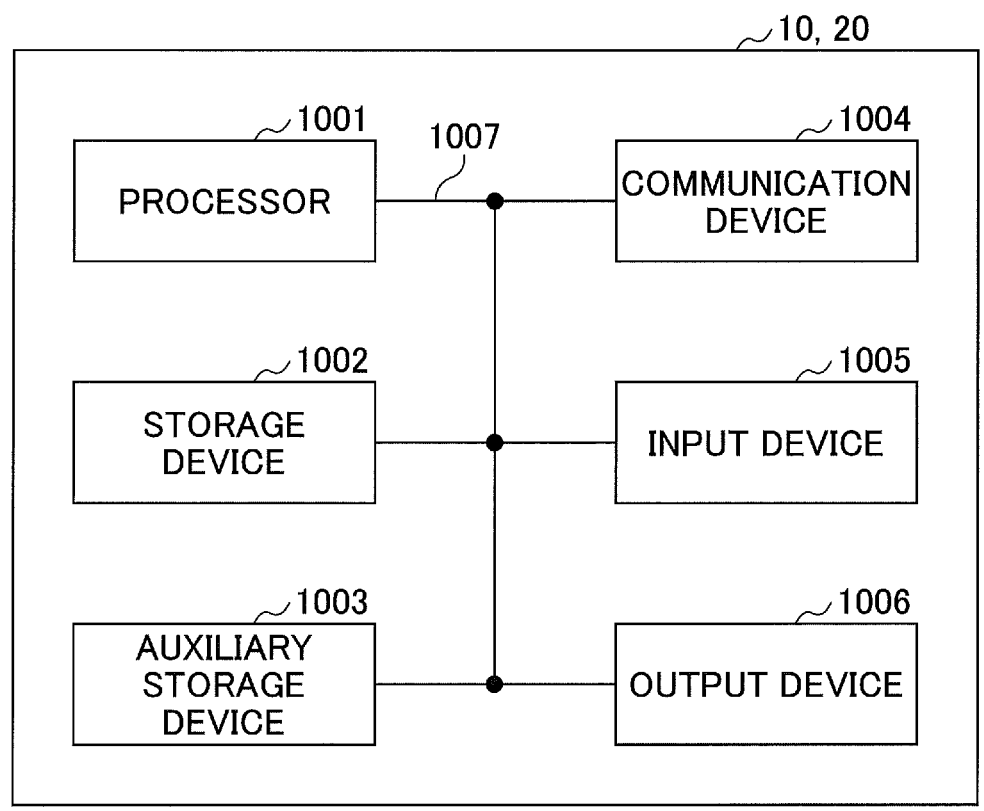
FIG. 19 is a diagram illustrating an example of the hardware configuration of the base station apparatus 10 or the user equipment 20 according to an embodiment of the present invention.

For example, the base station apparatus 10, the user equipment 20, or the like according to an embodiment of the present disclosure may function as a computer for processing the radio communication method of the present disclosure. FIG. 19 is a diagram illustrating an example of the hardware configuration of the base station apparatus 10 and the user equipment 20 according to an embodiment of the present disclosure. The base station apparatus 10 and the user equipment 20 described above may be physically configured as a computer device including a processor 1001, a storage device 1002, an auxiliary storage device 1003, a communication apparatus 1004, an input device 1005, an output device 1006, a bus 1007, or the like.

In the following description, the term "apparatus" can be read as circuits, devices, units, etc. The hardware configuration of the base station apparatus 10 and the user equipment 20 may be configured to include one or more of the devices shown in the figure or may be configured without some of the devices.

Each function in the base station apparatus 10 and the user equipment 20 is realized by having the processor 1001 perform an operation by reading predetermined software (programs) on hardware such as the processor 1001 and the storage device 1002, and by controlling communication by the communication apparatus 1004 and controlling at least one of reading and writing of data in the storage device 1002 and the auxiliary storage device 1003.

Processor 1001 operates, for example, an operating system to control the entire computer. The processor 1001 may be comprised of a central processing unit (CPU) including an interface with peripheral devices, a controller, an arithmetic unit, a register, and the like. For example, the above-described control unit 140, control unit 240, and the like may be implemented by the processor 1001.

The processor 1001 reads out a program (program code), software module, data, or the like from at least one of the auxiliary storage device 1003 and the communication apparatus 1004 to the storage device 1002 and performs various processing in accordance with the above. As a program, a program that causes a computer to execute at least a part of the operation described in the above-described embodiment is used. For example, the control unit 140 of the base station apparatus 10 illustrated in FIG. 17 may be stored in the storage device 1002 and implemented by a control program operating in the processor 1001. For example, the control section 240 of the user equipment 20 illustrated in FIG. 18 may be stored in the storage device 1002 and implemented by a control program operating in the processor 1001. Although the foregoing processes have been described and executed by one processor 1001, they may be executed simultaneously or sequentially by two or more processors 1001. Processor 1001 may be implemented by one or more chips. The program may be transmitted from the network via a telecommunication line.

Storage 1002 is a computer-readable recording medium and may be comprised of at least one of, for example, ROM (Read Only Memory), EPROM (Erasable Programmable ROM), EEPROM (Electrically Erasable Programmable ROM), RAM (Random Access Memory), and the like. Storage 1002 may be referred to as a register, cache, main memory (main memory), or the like. The storage device 1002 can store programs (program codes), software modules, etc., executable to implement a communication method according to an embodiment of the present disclosure.

The auxiliary storage device 1003 is a computer-readable recording medium and may comprise at least one of an optical disk, such as a CD-ROM (Compact Disc ROM), a hard disk drive, a flexible disk, a magneto-optical disk (e.g., a compact disk, a digital versatile disk, a Blu-ray disk), a smart card, a flash memory (e.g., a card, a stick, a key drive), a floppy disk, a magnetic strip, and the like. The storage medium described above may be, for example, a database, a server, or other suitable medium that includes at least one of a storage device 1002 and an auxiliary storage device 1003.

The communication apparatus 1004 is a hardware (transmitting/receiving device) for performing communication between computers via at least one of a wired network and a wireless network, and is also referred to as a network device, a network controller, a network card, a communication module, or the like. Communications device 1004 may comprise a high frequency switch, duplexer, filter, frequency synthesizer, or the like, for example, to implement at least one of a frequency division duplex and a time division duplex. For example, the transmitting/receiving antenna, the amplifier unit, the transceiving unit, the transmission line interface, and the like may be implemented by the communication apparatus 1004. Transmitters and receptacles may be physically or logically isolated implementations of the transmitters and receivers.

Input device 1005 is an input device (e.g., a keyboard, mouse, microphone, switch, button, sensor, etc.) that accepts external input. Output device 1006 is an output device (e.g., a display, speaker, LED lamp, etc.) that implements an external output. The input device 1005 and the output device 1006 may have an integral configuration (for example, a touch panel).

Each device, such as processor 1001 and storage 1002, is connected by a bus 1007 for communicating information. Bus 1007 may be constructed using a single bus or may be constructed using different buses between devices.

The base station apparatus 10 and the user equipment 20 may also include hardware, such as a microprocessor, a digital signal processor (DSP), an ASIC (Application Specific Integrated Circuit), a PLD (Programmable Logic Device), and an FPGA (Field Programmable Gate Array), all or part of each function block may be realized by the hardware. For example, processor 1001 may be implemented using at least one of the hardware.

(Summary of Embodiments)

As described above, as an example, a user equipment or a communication apparatus (e.g., a base station apparatus, a header UE) according to this embodiment is configured as shown in the first to sixth items below.

Item 1

A user equipment including:

a transmission unit configured to transmit sidelink data based on control information for sidelink scheduling received from a communication apparatus; and a reception unit configured to receive HARQ-ACK information for the sidelink data from a user equipment that receives the sidelink data, wherein the transmission unit transmits the HARQ-ACK information for the sidelink data to the communication apparatus.

Item 2

The user equipment as described in item 1, wherein the transmission unit transmits, to the communication apparatus, a HARQ-ACk codebook including HARQ-ACK information for data received from the communication apparatus by the reception unit and HARQ-ACK information for the sidelink data.

Item 3

A communication apparatus including:

a transmission unit configured to transmit control information, to a first user equipment, for sidelink scheduling for transmission of sidelink data by the first user equipment; and a reception unit configured to receive HARQ-ACK information from the first user equipment that receives the HARQ-ACK information, for the sidelink data, transmitted from a second user equipment that receives the sidelink data.

Item 4

A user equipment including:

a reception unit configured to receive sidelink data from a user equipment that receives control information for sidelink scheduling from a communication apparatus; and a transmission unit configured to transmit, to the communication apparatus, HARQ-ACK information for the sidelink data.

Item 5

The user equipment as described in item 4, wherein the transmission unit transmits, to the communication apparatus, a HARQ-ACk codebook including HARQ-ACK information for data received from the communication apparatus by the reception unit and HARQ-ACK information for the sidelink data.

Item 6

A communication apparatus including:

a transmission unit configured to transmit control information, to a first user equipment, for sidelink scheduling; and a reception unit configured to receive HARQ-ACK information for sidelink data from a second user equipment that receives the sidelink data transmitted from the first user equipment.

According to the configuration described in items 1, 3, 4, and 6, a technique is provided that enables the proper execution of HARQ operation in the sidelink.

In addition, according to the structure described in items 2 and 5. The HARQ-ACK codebook can be created and transmitted efficiently.

(Supplement to Embodiments)

Thus, although embodiments of the present invention have been described, the disclosed invention is not limited to such embodiments, and various modifications, modifications, alternatives, substitutions, etc. will be understood by those skilled in the art. Specific numerical examples have been used to facilitate understanding of the invention, but unless otherwise indicated, they are merely examples and any appropriate values may be used. Classification of items in the above description is not essential to the present invention, and the items described in two or more items may be used in combination as needed, or the items described in one item may be applied to the items described in another item (unless there is a conflict). The functional or processing unit boundaries in the functional block diagram do not necessarily correspond to the physical part boundaries. The operation of the plurality of functions may be performed physically by one component, or the operation of one function may be performed physically by the plurality of components. As for the processing procedure described in the embodiment, the order of the processing may be changed unless there is no conflict. For convenience of process description, the base station apparatus 10 and user equipment 20 have been described using a functional block diagram, but such devices may be implemented in hardware, software, or a combination thereof. Software operated by a processor of the base station apparatus 10 in accordance with embodiments of the present invention and software operated by a processor of the user equipment 20 in accordance with embodiments of the present invention may be stored in random access memory (RAM), flash memory, read-only memory (ROM), EPROM, EEPROM, register, hard disk (HDD), removable disk, CD-ROM, database, server, or any other suitable storage medium.

The notification of information is not limited to the aspect/embodiment described in the present disclosure and may be performed by other methods. For example, the notification of information may be performed by physical layer signaling (for example, downlink control information (DCI) or uplink control information (UCI)), higher layer signaling (for example, radio resource control (RRC) signaling, medium access control (MAC) signaling, or broadcast information (a master information block (MIB) or a system information block (SIB)), other types of signaling, or a combination thereof. The RRC signaling may also be referred to as an RRC message. For example, the RRC signaling may be an RRC connection setup message or an RRC connection reconfiguration message.

Each aspect/embodiment described in the present disclosure may be applied to at least one of systems using Long Term Evolution (LTE), LTE-Advanced (LTE-A), SUPER 3G, IMT-Advanced, a 4th generation mobile communication system (4G), a 5th generation mobile communication system (5G), Future Radio Access (FRA), new Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), and other appropriate systems and next-generation systems extended on the basis of these systems. In addition, a plurality of systems may be combined (for example, a combination of at least one of LTE and LTE-A and 5G) and then applied.

For example, the order of the process procedures, the sequence, and the flowchart in each aspect/embodiment described in the specification may be interchanged as long as there is no contradiction. For example, in the method described in the present disclosure, elements of various steps are presented using an exemplary order and the invention is not limited to the presented specific order.

The particular operation herein described as performed by the base station apparatus 10 may in some instances be performed by its upper node. In a network of one or more network nodes having the base station apparatus 10, it will be apparent that various operations performed for communication with the user equipment 20 can be performed by at least one of other network nodes other than the base station apparatus 10 and the base station apparatus (e.g., but not limited to MME, S-GW, etc.). Although the above illustrates that there is only one other network node other than the base station apparatus 10, the other network nodes may be a combination (e.g., MME and S-GW) of a plurality of other network nodes.

For example, the information and the signals described in the present disclosure can be output from a higher layer (or a lower layer) to a lower layer (or a higher layer). The information and the signals may be input or output through a plurality of network nodes.

For example, the input or output information may be stored in a specific location (for example, a memory) or may be managed using a management table. For example, the input or output information may be overwritten, updated, or edited. For example, the output information may be deleted. For example, the input information may be transmitted to other apparatuses.

The determination described in the present disclosure may be performed with a value (0 or 1) represented by 1 bit, may be performed by a true or false value (Boolean: true or false), or may be performed by comparison with a numerical value (for example, comparison with a predetermined value).

Of course, regardless of whether software is referred to as software, firmware, middleware, a microcode, or a hardware description language or is referred to as other names, the software needs be interpreted broadly to mean, for example, a command, a command set, a code, a code segment, a program code, a program, a sub-program, a software module, an application, a software application, a software package, a routine, a subroutine, an object, an executable file, an execution thread, a procedure, and a function.

In addition, for example, software, a command, and information may be transmitted or received through a transmission medium. For example, in a case in which software is transmitted from a website, a server, or other remote sources by at least one of a wired technology (for example, a coaxial cable, an optical fiber cable, a twisted pair, or a digital subscriber line (DSL)) and a wireless technology (for example, infrared rays or microwaves), at least one of the wired technology and the wireless technology is included in the definition of a transmission medium.

For example, the information and the signals described in the present disclosure may be represented by any of various other techniques. For example, the data, the order, the command, the information, the signal, the bit, the symbol, and the chip mentioned throughout the above description may be represented by a voltage, a current, an electromagnetic wave, a magnetic field or a magnetic particle, an optical field or a photon, or any combination thereof.

The terms described in the present disclosure and/or the terms necessary to understand the present disclosure may be replaced with terms that have the same or similar meanings. For example, at least one of a channel and a symbol may be a signal (signaling). In addition, a signal may be a message. Further, a component carrier (CC) may be referred to as, for example, a carrier frequency, a cell, or a frequency carrier.

The terms "system" and "network" used in the present disclosure are compatibly used.

For example, the information and the parameter described in the present disclosure may be represented by an absolute value, may be represented by a relative value from a predetermined value, or may be represented by another piece of corresponding information. For example, a radio resource may be instructed by an index.

The names used for the above-mentioned parameters are not limited in any respect. Further, for example, a numerical expression using the parameters may be different from the numerical expression described explicitly in the present disclosure. Since various channels (for example, PUCCH and PDCCH) and information elements can be identified by appropriate names, various names assigned to the various channels and information elements are not limited in any respect.

In the present disclosure, for example, the terms "base station (BS)", "radio base station", "base station apparatus", "fixed station", "NodeB", "eNodeB (eNB)", "gNodeB (gNB)", "access point", "transmission point", "reception point", "transmission/reception", "cell", "sector", "cell group", "carrier", and "component carrier" can be compatibly used. The base station may also be referred to as, for example, a macro cell, a small cell, a femto cell, or a pico cell.

The base station can accommodate one cell or a plurality (for example, three) of cells. Ina case in which the base station accommodates a plurality of cells, the entire coverage area of the base station can be divided into a plurality of small areas and each of the small areas can also provide a communication service using a base station subsystem (for example, an indoor small-sized base station (remote radio head (RRH)). The term "cell" or "sector" refers to a part or all of the coverage area of at least one of the base station and the base station subsystem that provide a communication service in the coverage.

In the present disclosure, for example, the terms "mobile station (MS)", "user terminal", "user equipment (UE)", and "terminal" can be compatibly used.

The mobile station may be referred to as a "subscriber station", a "mobile unit", a "subscriber unit", a "wireless unit", a "remote unit", a "mobile device", a "wireless device", a "wireless communication device", a "remote device", a "mobile subscriber station", an "access terminal," a "mobile terminal", a "wireless terminal", a "remote terminal", a "handset", a "user agent", a "mobile client", a "client", or some other suitable terms, depending on the person skilled in the art.

At least one of the base station and the mobile station may be referred to as, for example, a transmitting device, a receiving device, or a communication device. In addition, at least one of the base station and the mobile station may be a moving body or a device provided in the moving body. The moving body may be a vehicle (for example, a car or an airplane), an unmanned moving body (for example, a drone or an autonomous driving vehicle), or a robot (a manned type or an unmanned type). Further, at least one of the base station and the mobile station includes a device that does not necessarily move during a communication operation. For example, at least one of the base station and the mobile station may be an Internet of Things (IoT) device such as a sensor.

In addition, the base station in the present disclosure may be read by the user terminal. For example, each aspect/embodiment of the present disclosure may be applied to a configuration in which communication between base stations and user terminals is replaced by communication between multiple user equipments 20 (e.g., may be referred to as D2D (Device-to-Device), V2X (Vehicle-to-Everything), etc.). In this case, the function of the base station apparatus 10 described above may be provided by the user equipment 20. The phrases "uplink" and "downlink" may also be replaced by the phrases corresponding to terminal-to-terminal communication (e.g., "side"). For example, an uplink channel, a downlink channel, or the like may be read by a side channel.

Similarly, the user terminal in the present disclosure may be read by the base station. In this case, the base station may have the functions provided by the user terminal described above.

The term "determining" used in the present disclosure includes a wide variety of operations in some cases. The "determining" can include cases in which performing, for example, judging, calculating, computing, processing, deriving, investigating, looking up, search, or inquiry (for example, looking up in a table, a database, or other data structures), and ascertaining is considered to perform "determining". In addition, the "determining" can include cases in which performing, for example, receiving (for example, receiving information), transmitting (for example, transmitting information), inputting, outputting, and accessing (for example, accessing data in a memory) is considered to perform "determining". Further, the "determining" can include cases in which performing, for example, resolving, selecting, choosing, establishing, and comparing is considered to be perform "determining". That is, the "determining" can include a case in which any operation is considered to perform "determining". Furthermore, the "determining" may be replaced with, for example, "assuming", "expecting", or "considering".

The terms "connected" and "coupled" or all modifications of the terms mean all direct or indirect connection or coupling between two or more elements and can include the presence of one or more intermediate elements between two mutually "connected" or "coupled" elements. The connection or coupling between elements may be physical connection, logical connection, or any combination thereof. For example, the "connection" may be replaced with "access". In a case in which the connection or the coupling is used in the present disclosure, two elements can be considered to be mutually "connected" or "coupled" by using at least one of one or more electric wires, cables, and printed electric connection and by using electromagnetic energy with wavelengths in a radio frequency domain, a microwave domain, and an optical (both visible and invisible) domain as several non-limited and non-inclusive examples.

A reference signal can also be abbreviated to RS (reference signal) and may also be referred to as a pilot according to the standard to be applied.

The term "based on" used in the present disclosure does not mean "based on only" unless otherwise stated. In other words, the term "based on" means both "based on only" and "based on at least".

Any reference to elements using, for example, names "first" and "second" used in the present disclosure does not generally limit the quantity or order of those elements. The names can be used in the present disclosure as methods used to conveniently distinguish two or more elements from each other. Therefore, the reference to the first and second elements does not mean that only two elements are employed or the first element is prior to the second element in a certain form.

In the configuration of each of the above-mentioned apparatuses, the term "means" may be replaced with a "unit", a "circuit", or a "device".

In the present disclosure, in a case in which the terms "include" and "including" and modifications thereof are used, the terms are intended to be inclusive, as is the term."comprising". Further, the term "or" used in the present disclosure is not intended to be an exclusive OR.

A radio frame may be configured by one frame or a plurality of frames in the time domain. One frame or a plurality of frames may also be referred to as subframes in the time domain. The subframe maybe configured by one slot or a plurality of slots in the time domain. The subframe maybe a fixed time length (for example, 1 ms) that does not depend on numerology.

The numerology may be a communication parameter that is applied to at least one of the transmission and reception of a certain signal or channel. The numerology may indicate, for example, at least one of a subcarrier spacing (SCS), a bandwidth, a symbol length, a cyclic prefix length, a transmission time interval (TTI), the number of symbols per TTI, the configuration of radio frame, a specific filtering process performed by a transceiver in the frequency domain, and a specific windowing process performed by the transceiver in the time domain.

The slot may also be configured by one symbol or a plurality of symbols (for example, orthogonal frequency division multiplexing (OFDM) symbols or single carrier frequency division multiple access (SC-FDMA) symbols) in the time domain. The slot may be a time unit based on the numerology.

The slot may include a plurality of minislots. Each minislot may be configured by one symbol or a plurality of symbols in the time domain. In addition, the minislot may be referred to as a sub-slot. The minislot may be configured by symbols whose number is less than the number of slots. PDSCH (or PUSCH) that is transmitted in a time unit larger than the minislot may be referred to as a PDSCH (or PUSCH) mapping type A. The PDSCH (or PUSCH) transmitted using the minislot may be referred to as a PDSCH (or PUSCH) mapping type B.

Each of the radio frame, the subframe, the slot, the minislot, and the symbol indicates a time unit when a signal is transmitted. For each of the radio frame, the subframe, the slot, the minislot, and the symbol may be called different names corresponding thereto.

For example, one subframe may also be referred to as a transmission time interval (TTI), a plurality of consecutive subframes may also be referred to as a TTI, or one slot or one minislot may also be referred to as a TTI. That is, at least one of the subframe and the TTI may be a subframe (1 ms) in the existing LTE, a period (for example, 1 to 13 symbols) shorter than 1 ms, or a period longer than 1 ms. In addition, the unit indicating the TTI is not referred to as the subframe, but may be referred to as, for example, a slot or minislot.

Here, the TTI means, for example, a minimum time unit of scheduling in wireless communication. For example, in the LTE system, a base station performs scheduling to allocate radio resources (for example, frequency bandwidths and transmission power which can be used by each user equipment 20) to a mobile station in the TTI unit. The definition of the TTI is not limited thereto.

The TTI may be the transmission time unit of, for example, a channel-encoded data packet (transport block), a code block, or a code word or may be the processing unit of, for example, scheduling or link adaptation. In addition, the number of slots (the number of minislots) forming the minimum time unit of scheduling may be controlled. When the TTI is assigned, a time interval (for example, the number of symbols) in which a transport block, a code block, a code word, or the like is actually mapped may be shorter than the TTI.

In a case in which one slot or one minislot is referred to as a TTI, one or more TTIs (that, one or more slots or one or more minislots) may be the minimum time unit of scheduling. In addition, the number of slots (the number of minislots) forming the minimum time unit of scheduling may be controlled.

A TTI having a time duration of 1 ms may be referred to as, for example, a general TTI (TTI in LTE Rel. 8-12), a normal TTI, a long TTI, a general subframe, a normal subframe, a long subframe, or a slot. A TTI that is shorter than the general TTI may be referred to as, for example, a shortened TTI, a short TTI, a partial TTI or a fractional TTI, a shortened subframe, a short subframe, a minislot, a sub-slot, or a slot.

The long TTI (for example, a general TTI or a subframe) may be replaced with a TTI having a time duration greater than 1 ms and the short TTI (for example, a shortened TTI) may be replaced with a TTI having a TTI duration that is shorter than the TTI duration of the long TTI and is equal to or greater than 1 ms.

A resource block (RB) is the unit of resource allocation in the time domain and the frequency domain and may include one subcarrier or a plurality of consecutive subcarriers in the frequency domain. The number of subcarriers included in the RB may be the same regardless of the numerology and may be, for example, 12. The number of subcarriers included in the RB may be determined on the basis of the numerology.

The time domain of the RB may include one symbol or a plurality of symbols and may be the length of one slot, one minislot, one subframe, or one TTI. For example, each of one TTI and one subframe may be configured by one resource block or a plurality of resource blocks.

One RB or a plurality of RBs may be referred to as, for example, a physical resource block (PRB), a subcarrier group (SCG), a resource element group (REG), a PRB pair, or an RB pair.

Furthermore, the resource block may be configured by one resource element (RE) or a plurality of REs. For example, one RE maybe a radio resource region of one subcarrier and one symbol.

A bandwidth part (BWP) (may be referred to as a partial bandwidth) may indicate a subset of continuous common resource blocks (RBs) for a certain neurology in a certain carrier. Here, the common RB may be specified by an RB index based on a common reference point of the carrier. A PRB may be defined by a BWP and may be numbered within the BWP.

The BWP may include a UL BWP and a DL BWP. One BWP or a plurality of BWPs may be configured in one carrier for the UE.

At least one of the configured BWPs may be active and the UE may not expect to transmit and receive predetermined signals/channels outside the active BWP. In the present disclosure, for example, a "cell" and a "carrier" maybe replaced with a "BWP".

For example, the structures of the radio frame, the subframes, the slot, the minislot, and the symbol described above are only examples. For example, configurations, such as to the number of subframes included in the radio frame, the number of slots per subframe or radio frame, the number of minislots included in the slot, the number of symbols and RBs included in the slot or the minislot, the number of subcarriers included in the RB, the number of symbols in the TTI, a symbol duration, the length of a cyclic prefix (CP), can be changed in various manners.

In the present disclosure, for example, in a case in which the articles, such as a, an, and the, in English are added in translation, the present disclosure may include that the nouns that follow these articles are plural.

In the present disclosure, the term "A and B are different" may mean that "A and B are different from each other". The term may also mean that "A and B are different from C". The terms "separated" and "coupled" may be interpreted in the same way as "different".

The aspects/embodiments described in the present disclosure may be independently used, may be combined, or may be switched and used in accordance with execution. In addition, the notification of predetermined information (for example, the notification of "being X") is not limited to being performed explicitly and may be performed implicitly (for example, the notification of the predetermined information is not performed).

In the present disclosure, side link communication is an example of direct communication between terminals.

The present disclosure has been described in detail above. However, it should be apparent to those skilled in the art that the present disclosure is not limited to the embodiments described in the present disclosure. The present disclosure can be embodied as corrected and changed aspects without departing from the scope and spirit of the present disclosure defined by the claims. Therefore, the description of the present disclosure has been made for exemplary description and is not intended to have any restrictive meaning to the present disclosure.

DESCRIPTION OF SYMBOLS

10 Base station apparatus
110 Transmission unit
120 Reception unit
130 Configuration unit
140 Control unit
20 User equipment
210 Transmission unit
220 Reception unit
230 Configuration unit
240 Controller
1001 Processor
1002 Storage unit
1003 Auxiliary storage
1004 Communication device
1005 Input device
1006 Output device

The invention claimed is:

1. A terminal comprising:
a transmitter configured to transmit a plurality of pieces of sidelink data, on a physical sidelink shared channel (PSSCH), based on a plurality of pieces of control information received in downlink; and
a receiver configured to receive a plurality of pieces of feedback information for the plurality of pieces of sidelink data transmitted on the PSSCH,
wherein the transmitter is configured to transmit the plurality of pieces of feedback information, for the plurality of pieces of sidelink data transmitted on the PSSCH, in uplink by a same slot, and
wherein the transmitter is configured to determine a resource for transmitting the plurality of pieces of feedback information based on a last received piece of control information among the plurality of pieces of control information.

2. The terminal as claimed in claim 1, wherein the transmitter is configured to transmit the plurality of pieces of feedback information in which feedback information is arranged in a reception order of the control information.

3. The terminal as claimed in claim 1, wherein the transmitter is configured to transmit the plurality of pieces of feedback information, for the plurality of pieces of sidelink data transmitted on the PSSCH, in uplink by a same slot of a single physical uplink control channel (PUCCH).

4. A system comprising:
a terminal comprising:
a transmitter configured to transmit a plurality of pieces of sidelink data, on a physical sidelink shared channel (PSSCH), based on a plurality of pieces of control information received in downlink; and
a receiver configured to receive a plurality of pieces of feedback information for the plurality of pieces of sidelink data transmitted on the PSSCH,
wherein the transmitter of the terminal is configured to transmit the plurality of pieces of feedback information, for the plurality of pieces of sidelink data transmitted on the PSSCH, in uplink by a same slot, and
wherein the transmitter of the terminal is configured to determine a resource for transmitting the plurality of pieces of feedback information based on a last received piece of control information among the plurality of pieces of control information, and
a base station comprising:
a transmitter configured to transmit the plurality of pieces of control information; and
a receiver configured to receive the plurality of pieces of feedback information for the plurality of pieces of sidelink data transmitted on the PSSCH.

5. A feedback method executed by a terminal, the method comprising:
transmitting a plurality of pieces of sidelink data, on a physical sidelink shared channel (PSSCH), based on a plurality of pieces of control information received in downlink;
receiving a plurality of pieces of feedback information for the plurality of pieces of sidelink data transmitted on the PSSCH;
transmitting the plurality of pieces of feedback information, for the plurality of pieces of sidelink data transmitted on the PSSCH, in uplink by a same slot; and
determining a resource for transmitting the plurality of pieces of feedback information based on a last received piece of control information among the plurality of pieces of control information.

* * * * *